(12) United States Patent
Liao

(10) Patent No.: US 7,212,348 B2
(45) Date of Patent: May 1, 2007

(54) COMPACT ZOOM LENS SYSTEM

(75) Inventor: Chen-cheng Liao, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/463,231

(22) Filed: Aug. 8, 2006

(65) Prior Publication Data
US 2007/0035851 A1   Feb. 15, 2007

(30) Foreign Application Priority Data
Aug. 10, 2005   (TW) .............................. 94127229 A

(51) Int. Cl.
G02B 15/14   (2006.01)
(52) U.S. Cl. .................. 359/679; 359/680; 359/682; 359/683; 359/684; 359/685; 359/686; 359/715; 359/740; 359/741; 359/743; 359/753; 359/781; 359/783
(58) Field of Classification Search ................ 359/679, 359/680, 682, 683–685, 686, 715, 740, 741, 359/743, 753, 781, 783
See application file for complete search history.

(56) References Cited

U.S. PATENT DOCUMENTS

| | | | |
|---|---|---|---|
| 6,191,896 B1 | 2/2001 | Itoh | |
| 6,233,099 B1 | 5/2001 | Itoh | |
| 6,650,486 B2 | 11/2003 | Chen | |
| 6,816,320 B2 * | 11/2004 | Wada | ......................... 359/683 |
| 6,885,506 B2 * | 4/2005 | Yoneyama | .................. 359/682 |
| 2003/0012567 A1 | 1/2003 | Itoh | |
| 2004/0012860 A1 * | 1/2004 | Wada | ......................... 359/680 |

* cited by examiner

Primary Examiner—Evelyn A. Lester

(57) ABSTRACT

A compact zoom lens system includes, from the object side to the image side, a negative first lens group (1), a positive second lens group (2), a positive third lens group (3) and a positive fourth lens group (4). The first lens group is stationary, and both the second and third lens groups are movable for effecting focal length change. The fourth lens group is also movable to compensate for image plane shift due to focal length change and thereby maintain the position of the image plane. The compact zoom lens system has a significantly reduced lens count and thus has an overall length of only 20 mm while achieving an approximately 3× zoom ratio. Sufficient back focal length is ensured even for such a short overall length. By employing aspheric lenses (10, 20, 301, 31, 41) for aberration correction, a high level of optical performance can be ensured.

26 Claims, 21 Drawing Sheets

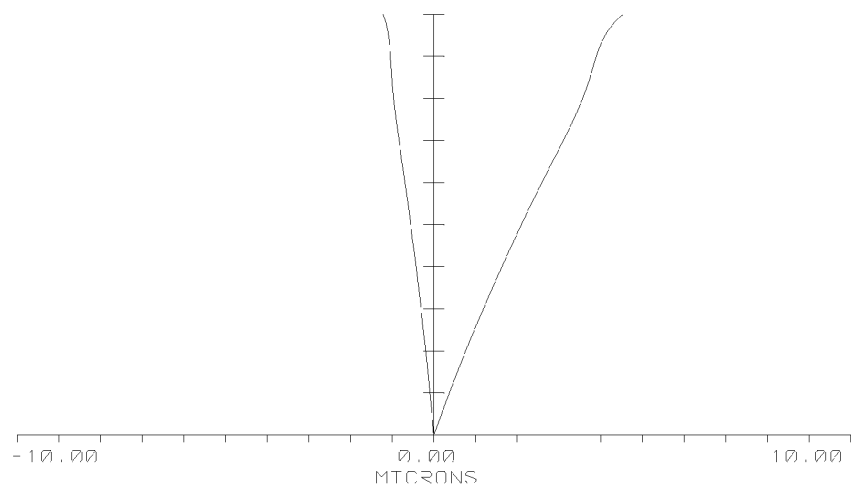
FIG. 14
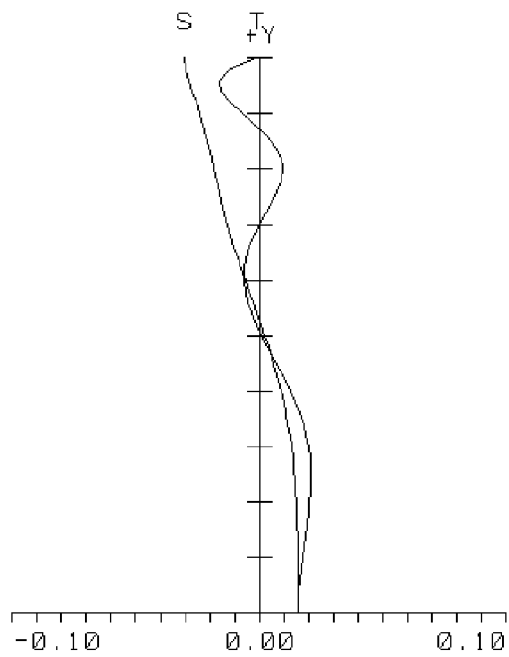 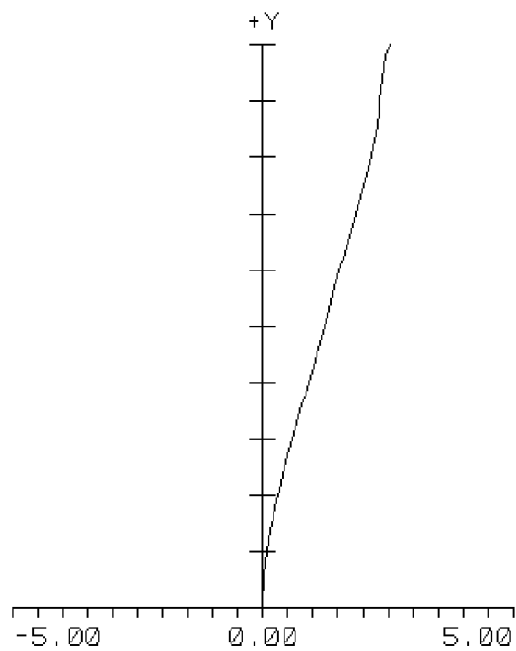
FIG. 15          FIG. 16

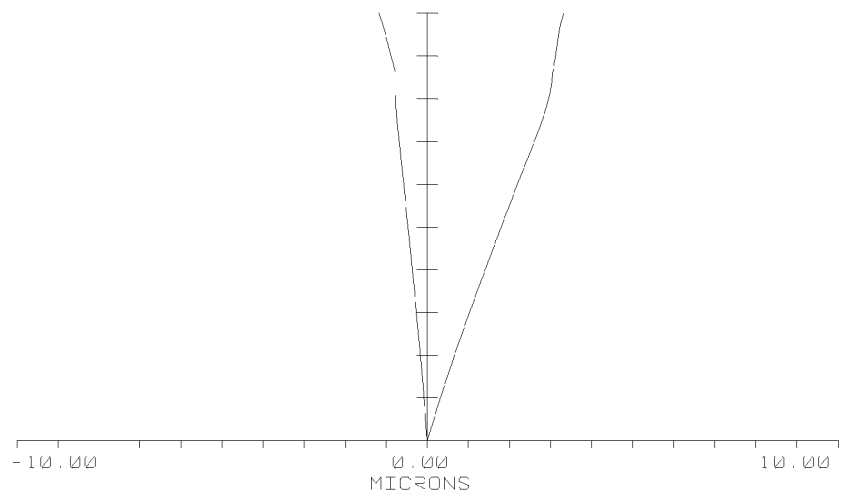
FIG. 27
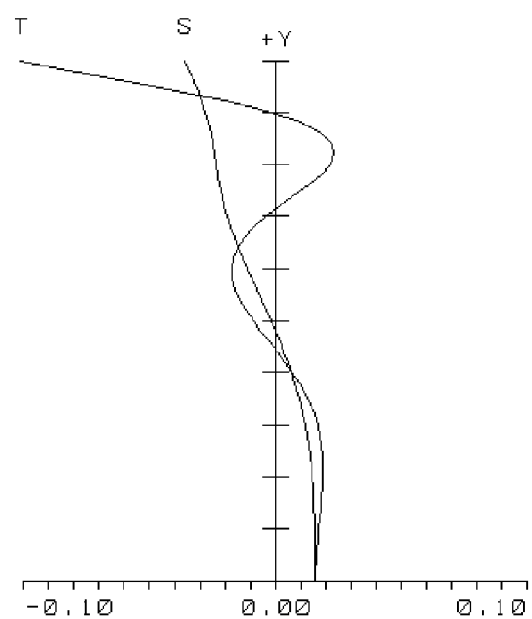 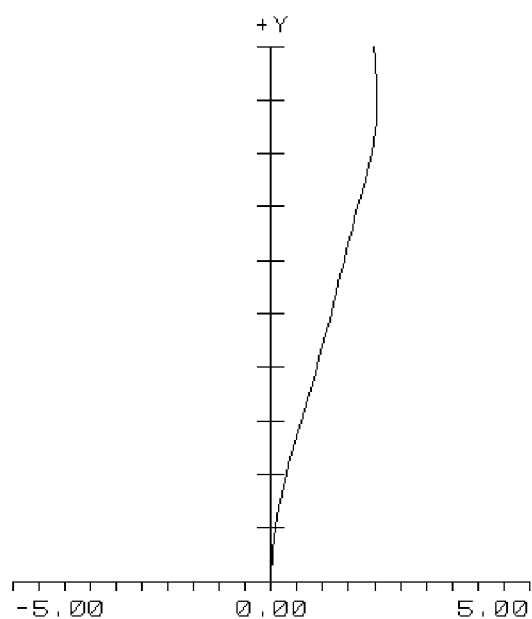
FIG. 28  FIG. 29

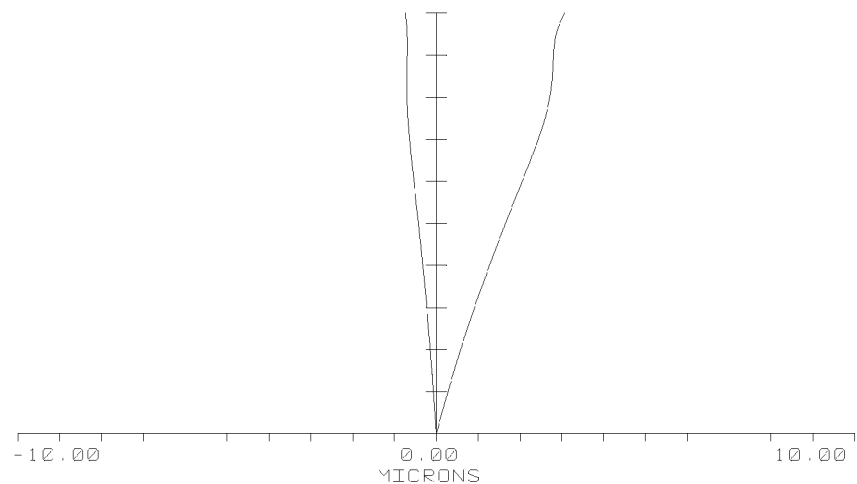
FIG. 40
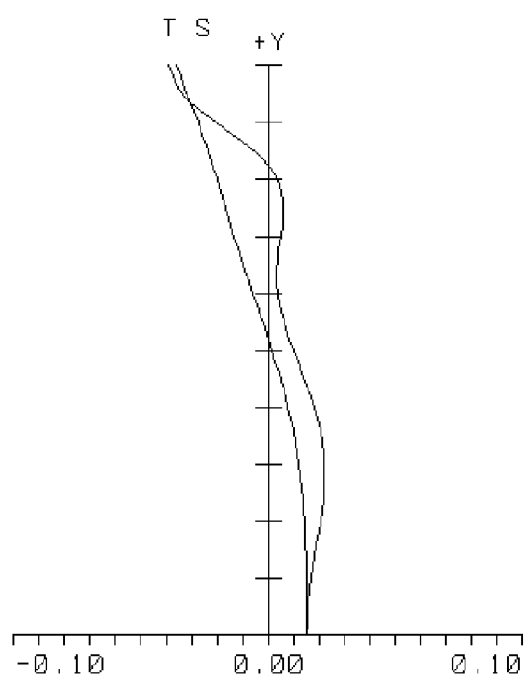
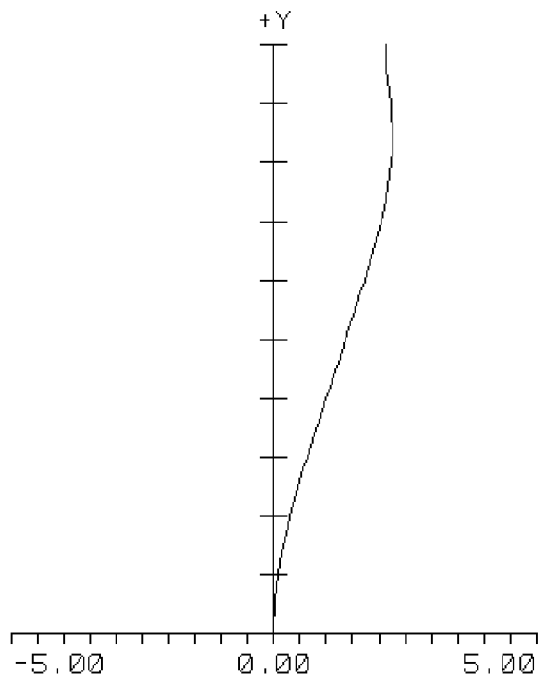
FIG. 41          FIG. 42

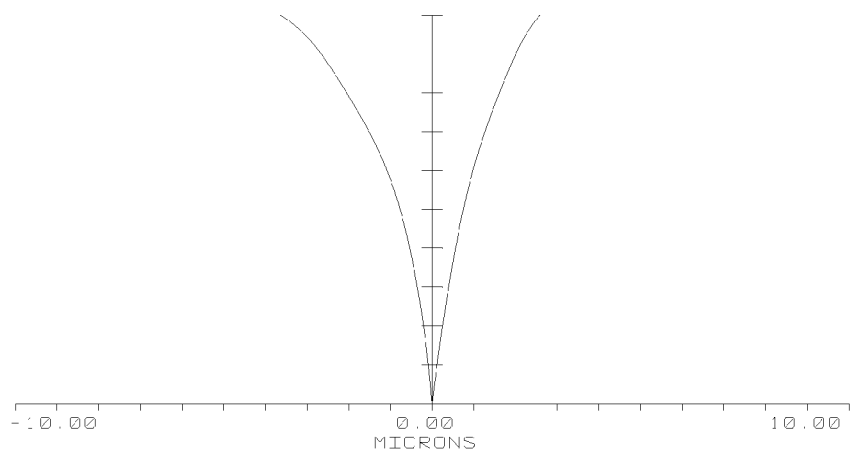
FIG. 45
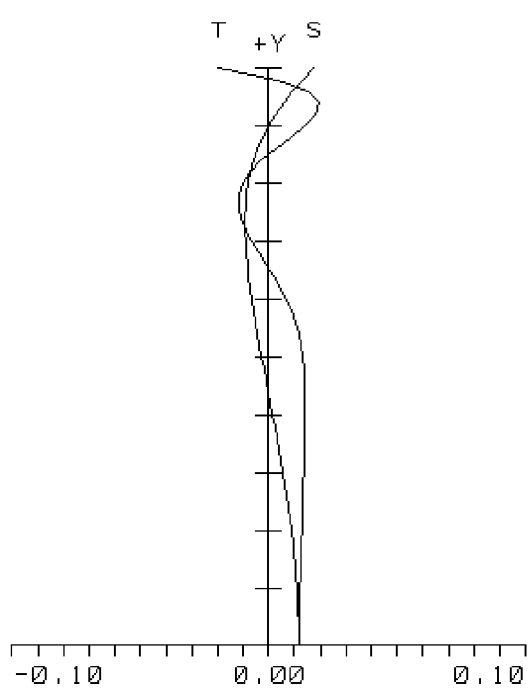 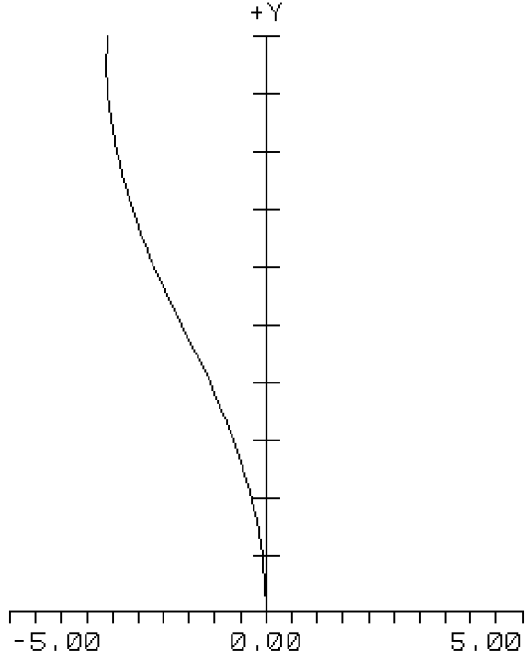
FIG. 46  FIG. 47

COMPACT ZOOM LENS SYSTEM

BACKGROUND OF THE INVENTION

1. Field of the Invention

The present invention relates to a zoom lens system, and particularly relates to a compact zoom lens system capable of taking both telephoto and wide angle shots, of which the overall length is fixed and shortened for use in a camera phone, a compact digital camera, etc.

2. Description of Prior Art

It is well known that, due to the limited space, photographing lenses used in camera phones and compact digital cameras have dimensions much smaller than those in photographic cameras, video cameras and common digital cameras. Accordingly, camera phones and compact digital cameras generally employ fixed focal length lenses, which are disclosed in, for example, U.S. Pat. No. 6,650,486.

Recently, with the rapid development of the solid state image pickup device used in cameras, such as a CCD (Charge-Coupled Device) sensor or a CMOS (Complimentary Metal-Oxide Semiconductor) sensor, image resolutions for camera phones have been increased from 0.1 million pixels, 0.35 million pixels to 1.3 million pixels and even 2 million pixels. However, since the focal length of a fixed lens is fixed rather than adjustable, the angle of view that the picture takes in is also set. Thus, the photo taker has to move closer or further to the object to be photographed or change lenses. In the former case, it may not be possible to get noticeably closer. Accordingly, it is very inconvenient for the photo taker to use a fixed lens for photography. In addition, when digital zoom is applied, the resulting image will be degraded. As is well known, the main disadvantage of digital zoom is that the more that the photo taker zooms in with the digital zoom, the greater the enlargement and the lower the image quality. Therefore, currently, optical zoom using a number of lenses is still more preferred.

Various designs of optical zoom lenses have been proposed. U.S. Pat. Nos. 6,191,896 and 6,233,099 assigned to Canon disclosed a four-group zoom lens system having, from the object side thereof, a negative-positive-negative-positive refractive power configuration. During zooming, all the lens groups move along the optical axis in such a manner that the distance between every two-lens groups is changed. US Patent Application Serial No. 20030012567 discloses a three-group zoom lens system having, from the object side thereof, a negative-positive-positive refractive power configuration. Zooming is effected by varying the distance between the first and second lens groups, and the third lens group is not moved during zooming. However, during focusing and zooming, the overall length of each of the conventional zoom lenses as described above is changed. When the position of the first lens group varies upon zooming, working distance and the focusing position varies in the close-up focusing range, so it is not so easy to handle and use. Further, each of the above conventional zoom lens system is composed of at least six single lenses, and thus is difficult to incorporate into a mobile phone with a thickness generally less than 20 mm. Also, the production cost and weight are increased, thereby contradicting the compactness trend. Even the above conventional zoom lens system is incorporated into the mobile phone, accident impact on or damage to the zoom lens system may be caused during operation since the overall length varies during focusing and zooming. In addition, since the front lens barrel is rotated during focusing, it is inconvenient for the photo taker to use a circular polarizing filter and Petal-type hood.

It is reported that, Philips Research has demonstrated a unique liquid zoom lens system that alters its focal length by changing its shape. The Philips liquid lens consists of two immiscible (non-mixing) fluids of different refractive index, one an electrically conducting aqueous solution and the other an electrically non-conducting oil, contained in a short tube with transparent end caps. Without an electrical charge, the surface of the conducting liquid forms a curve. But when a charge is applied through the electrodes, the surface tension of the liquid changes, altering its curvature and thus the focal point of light passing through it. Different voltages produce different curvature changes. However, the operational durability, the optical performance and the lifespan of this unique zoom lens system remain to be further tested. Therefore, its rapid introduction into high-volume manufacturing cannot be expected.

SUMMARY OF THE INVENTION

Accordingly, one object of the present invention is to provide a compact zoom lens system capable of taking both wide angle and telephoto shots, which has a reduced number of component lenses while without decreasing the optical performance.

Another object of the present invention is to provide a compact zoom lens system capable of taking both wide angle and telephoto shots, which has a fixed and shortened overall length.

To achieve the above objects of the present invention, a compact zoom lens system in accordance with the present invention includes, from the object side to the image side, a first lens group of negative refractive power, a second lens group of positive refractive power, a third lens group of positive refractive power, and a fourth lens group of positive refractive power. The first lens group is stationary for receiving light from the object to be photographed. The second, third and fourth lens groups are all movable along the optical axis. The second lens group is composed of a hybrid lens, which includes a single lens and a first resin layer formed on the image side of the single lens. The third lens group includes a single lens and a cemented lens having a second resin layer formed on the object side thereof. The fourth lens group is composed of a single lens. The overall length of the present compact lens is constant. By varying the distance between the second and third lens groups, zooming is effected. The fourth lens group is a compensation lens group that is movable to effect the correction of image-plane position shift resulting from focal length change, whereby the image plane position is fixed.

The compact zoom lens system of the present invention satisfies the following conditional expression:

$$1.3 < \frac{F_{12T}}{F_3} < 2.6 \qquad (a-1)$$

where $F_{12T}$ represents the combined focal length of the first and the second lens groups at the long focal length extremity, and $F_3$ represents the focal length of the third lens group.

The third and fourth lens groups of the present zoom lens system satisfies the following condition:

$$1.1 < \frac{F_4}{F_3} < 2.2 \quad (a-2)$$

where $F_4$ represents the focal length of the fourth lens group, and $F_3$ represents the focal length of the third lens group.

The present zoom lens system further satisfies the following condition:

$$0.1 < \frac{R_{12}}{TT} < 0.3 \quad (a-3)$$

where $R_{12}$ represents the curvature radius of surface R12 of the present compact lens system, and TT represents the total track of the present zoom lens system.

The present zoom lens system further satisfies the following condition:

$$0.18 < \frac{R_3}{TT} < 0.33 \quad (a-4)$$

where $R_3$ represents the curvature radius of surface R3 of the present compact lens system, and TT represents the total track of the present zoom lens system.

The first lens group of the present zoom lens system consists of a single plastic lens of negative refractive power.

The fourth lens group of the present zoom lens system consists of a single plastic lens of positive refractive power.

Each lens group of the present zoom lens system includes at least one aspheric surface.

The aspheric lens of each lens group of the present zoom lens system can be made of plastic.

The above aspheric surfaces of the present zoom lens system are expressed by the following equation:

$$z = \frac{ch^2}{1 + [1-(k+1)c^2h^2]^{1/2}} + Ah^4 + Bh^6 + Ch^8 + Dh^{10} + Eh^{12} + Fh^{14} + Gh^{16}$$

where z represents a sag amount which is defined as a distance from a point on the aspheric surface to a plane tangential to the aspheric surface at the optical axis; c=1/r, r is the paraxial radius of curvature; h represents a height of a point on the aspheric surface with respect to the optical axis; k represents a cone constant; and A, B, C, D, E, F and G are aspheric coefficients for fourth, sixth, eighth, tenth, twelfth, fourteenth and sixteenth order terms.

According to the concept of the present invention, the present zoom lens system is a four-group zoom lens system having a negative-positive-positive-positive optical configuration. Both the first lens group and the image plane positions are fixed. By movement of the second and third lens groups, zooming is effected. By movement of the fourth lens group, the shift of image-plane position resulting from focal length change can be compensated, whereby a clear image can be obtained. The present compact zoom lens system is composed of only six single lenses and thus has an overall length of only 20 mm while achieving an approximately 3× zoom ratio. Sufficient back focal length is ensured even for such a short overall length. By incorporating aspheric lens surfaces into the present zoom lens system for aberration correction, a high level of optical performance can be ensured. Accordingly, the present compact zoom lens system is suitable for high volume manufacturing, and is particularly suitable for use in compact digital camera modules.

BRIEF DESCRIPTION OF THE DRAWINGS

The present invention may best be understood through the following description with reference to the accompanying drawings, in which:

FIGS. 13–16 respectively show longitudinal aberration, lateral chromatic aberration, field curvature and distortion aberration at the wide-angle end of the present compact zoom lens system according to Numerical Embodiment 1;

FIGS. 26–29 respectively show longitudinal aberration, lateral chromatic aberration, field curvature and distortion aberration at the wide-angle end of the present compact zoom lens system according to Numerical Embodiment 2;

FIGS. 39–42 respectively show longitudinal aberration, lateral chromatic aberration, field curvature and distortion aberration at the wide-angle end of the present compact zoom lens system according to Numerical Embodiment 3;

FIGS. 44–47 respectively show longitudinal aberration, lateral chromatic aberration, field curvature and distortion aberration at the telephoto end of the present compact zoom lens system according to Numerical Embodiment 4;

DETAILED DESCRIPTION OF THE PREFERRED EMBODIMENTS

Figure 1:
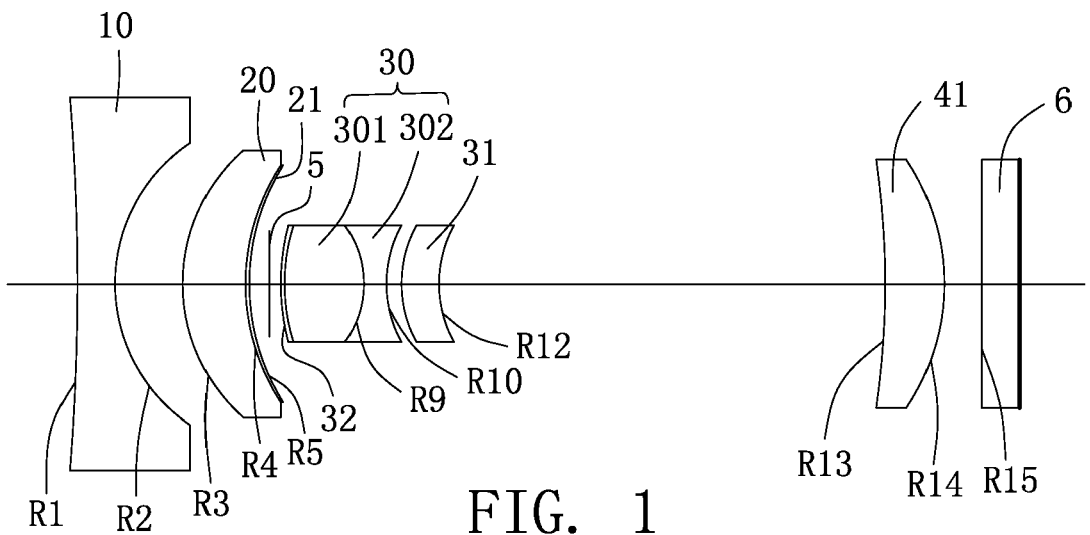
FIG. 1 is an optical cross-sectional view of a compact zoom lens system in accordance with the present invention, showing a lens configuration at the telephoto end.
Figure 2:
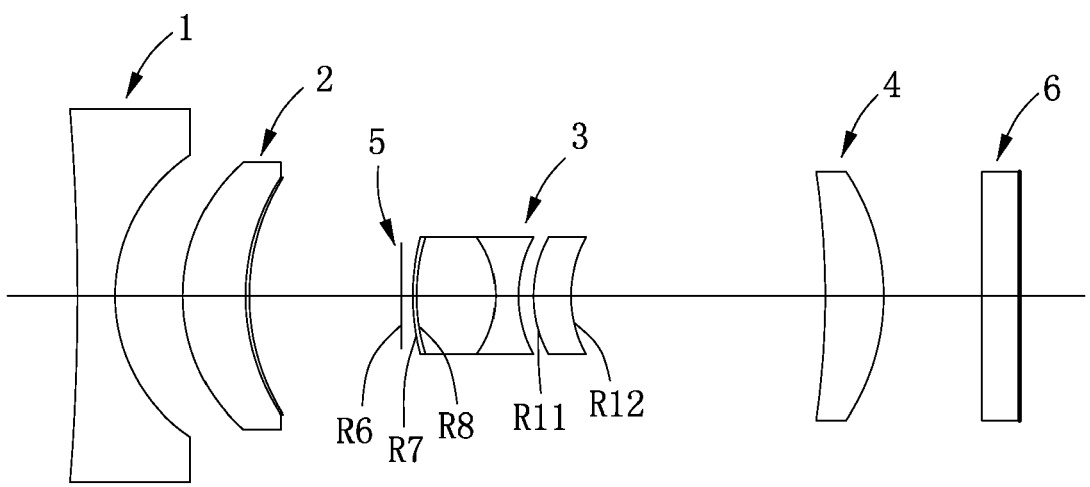
FIG. 2 is an optical cross-sectional view of a compact zoom lens system in accordance with the present invention, showing a lens configuration at an intermediate zoom position.
Figure 3:
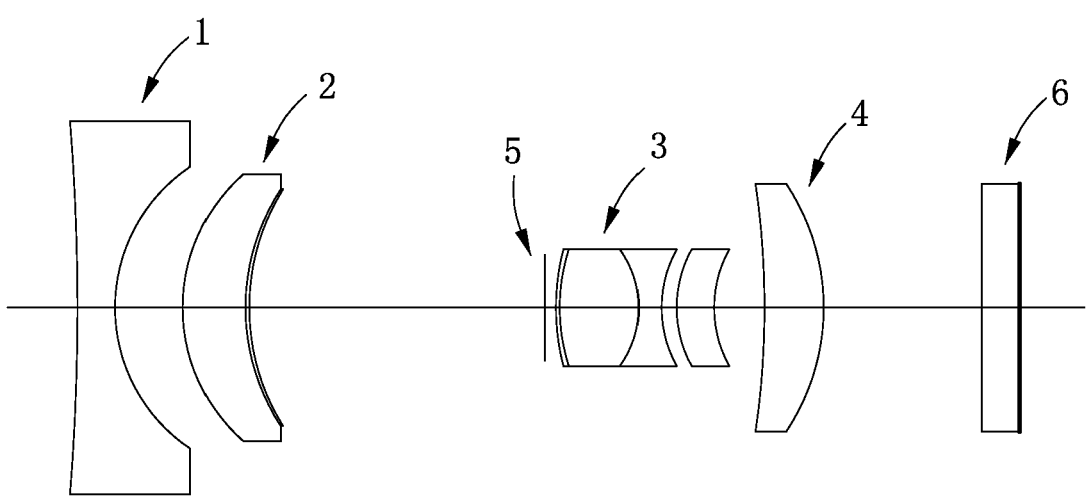
FIG. 3 is an optical cross-sectional view of a compact zoom lens system in accordance with the present invention, showing a lens configuration at the wide-angle end.

FIGS. 1–3 are optical cross-sectional views of a compact zoom lens system in accordance with the present invention, showing a lens configuration at the telephoto end, at an intermediate zoom position and at the wide-angle end, respectively. The present compact zoom lens system includes, from the object side to the image side, a first lens group 1 of negative refractive power, a second lens group 2 of positive refractive power, a third lens group 3 of positive refractive power, and a fourth lens group 4 of positive refractive power. The first lens group 1 includes a light-receiving lens 10 located at the frontmost position of the optical system for receiving light from the object to be photographed. This light-receiving lens 10 is preferably made of plastic by injection molding, and is an aspheric lens having at least one aspheric surface. In the preferred embodiment, the first surface R1 of the light-receiving lens 10 on the object side is a slightly concave surface, and the opposite second surface R2 on the image side is also a concave surface. The present zoom lens system thus has an angle of view of 70 degrees at the wide-angle end.

The second lens group 2, which is movable along the optical axis for effecting focal length change, is composed of a hybrid lens that includes a single lens 20 made of glass and a first resin layer 21 formed on the image side of the single lens 20. The first surface R3 of the single lens 20 on the object side is a convex surface, and the second surface R4 of the single lens 20 on the image side is a concave surface. At least one of the first and second surfaces R3, R4 is made aspheric.

The third lens group 3, which is also movable along the optical axis for effecting focal length change, includes a cemented lens 30 and a single, plastic lens 31. The cemented lens 30 consists of a convex lens 301 of positive refractive power and a concave lens 302 of negative refractive power. The convex lens 301 has a second resin layer 32 formed on an object-side surface R8 thereof. At least one of the cemented lens 30 and the single, plastic lens 31 is an aspheric lens.

The fourth lens group 4 is movable to compensate for the image plane shift resulting from the focal length change, so that the position of the image plane, on which an image pickup device (a photoelectric conversion element) such as a CCD or CMOS is to be disposed, is maintained. The fourth lens group 4 consists of a single positive lens 41 preferably made of plastic. At least one of the opposite first and second surfaces R13, R14 of the single positive lens 41 is aspheric.

A stop 5 is further arranged between the second and third lens groups 2, 3 for light intensity adjustment. A glass member 6, corresponding to an IR (infrared) filter, a cover glass of an image pickup device, or the like, is arranged between the fourth lens group 4 and the image plane. Both the first lens group 1 and the image plane are stationary, so that the overall length of the present zoom lens system is fixed, whereby incorporation of the present zoom lens system into compact digital camera modules such as those used in camera phones is significantly facilitated, and risk of accident impact on and damage to the camera phones during carry and use thus can be decreased. According to the configuration of the present zoom lens system, zooming is effected by moving the second and third lens groups 2, 3, and image plane shift caused by zooming is compensated by adjusting the position of the fourth lens group 4. FIGS. 1, 2 and 3 respectively show the lens configuration of the present compact zoom lens system at a telephoto end (or at a long focal length), at an intermediate zoom position (or at a middle focal length) and at a wide-angle end (or at a short focal length). It is clearly shown in these figures that, during zooming and focusing, the first lens group 1 is stationary, and the second, third, fourth lens groups 2, 3, 4 are all movable along the optical axis.

As disclosed above, the present zoom lens system employs only six single lenses in four groups, and thus is compact in configuration. The application of an inner focusing system improves handling and focus operation from infinity to close-up, by keeping the overall length of the present zoom lens system constant. It also allows easy handling and use of circular polarizing filters, as the front barrel does not rotate during focusing. Specifically, the present zoom lens system has an overall length of approximately 20 mm, making it easy to incorporate into miniature optical pathways, such as those in camera phones or compact digital cameras.

The present zoom lens system satisfies the following conditional expression:

$$1.3 < \frac{F_{12T}}{F_3} < 2.6 \qquad (a-1)$$

where $F_{12T}$ represents the combined focal length of the first and the second lens groups 1, 2 at the long focal length extremity, and $F_3$ represents the focal length of the third lens group 3. When the power of the third lens group 3 gradually increases, that is, $F_3$ gradually decreases, the value $F_{12T}/F_3$ may exceed the upper limit of condition (a-1). Consequently, the back focal length of the present zoom lens system will become too small to allow for the arrangement of the glass member 6 (a cover glass or an IR filter) between the fourth lens group 4 and the image plane. When the power of the third lens group 3 gradually decreases, that is, $F_3$ gradually increases, the value $F_{12T}/F_3$ may fall below the lower limit of condition (a-1). As a result, the total track of the present zoom lens system will increase.

The third and fourth lens groups 3, 4 of the present zoom lens system satisfies the following condition:

$$1.1 < \frac{F_4}{F_3} < 2.2 \quad (a-2)$$

where $F_4$ represents the focal length of the fourth lens group 4, and $F_3$ represents the focal length of the third lens group 3. When the power of the fourth lens group 4 gradually decreases, that is, $F_4$ gradually increases, the value $F_4/F_3$ may exceed the upper limit of condition (a-2). Consequently, the telecentricity of the optical system will be deteriorated, and the total track of the present zoom lens system will be increased. When the power of the fourth lens group 4 gradually increases, that is, $F_4$ gradually decreases, the value $F_4/F_3$ may fall below the lower limit of condition (a-2). As a result, the back focal length of the present zoom lens system will be insufficient to allow for the arrangement of the glass member 6.

The present zoom lens system further satisfies the following condition:

$$0.1 < \frac{R_{12}}{TT} < 0.3 \quad (a-3)$$

where $R_{12}$ represents the curvature radius of image-side surface R12 of the lens 31, and TT represents the total track of the present zoom lens system. When $R_{12}$ gradually increases to exceed the upper limit of condition (a-3), the total track of the present zoom lens system must be increased so as to obtain the desired image height. When $R_{12}$ gradually decreases to fall below the lower limit of condition (a-3), elimination of coma aberrations will become difficult.

The present zoom lens system further satisfies the following condition:

$$0.18 < \frac{R_3}{TT} < 0.33 \quad (a-4)$$

where $R_3$ represents the curvature radius of object-side surface R3 of the lens 20, and TT represents the total track of the present zoom lens system. When $R_3$ gradually increases to exceed the upper limit of condition (a-4), elimination of coma and astigmatism aberrations at the wide-angle end will become difficult. When $R_3$ gradually decreases to fall below the lower limit of condition (a-4), elimination of astigmatism aberrations at the wide-angle end will become difficult.

To ensure good aberration correction performance, each lens group of the present zoom lens system includes at least one aspheric surface. If these aspheric lenses are configured as spherical lenses, additional cemented correcting lenses must be employed for aberration compensation, which results in increased overall length of the zoom lens system. By configuring these lenses as aspheric lenses, the lens count of the present zoom lens system is significantly reduced, thereby reducing the overall physical length. The aspheric surfaces of the present zoom lens system are expressed by the following equation:

$$z = \frac{ch^2}{1+[1-(k+1)c^2h^2]^{1/2}} + Ah^4 + Bh^6 + Ch^8 + Dh^{10} + Eh^{12} + Fh^{14} + Gh^{16}$$

where z represents a sag amount which is defined as a distance from a point on the aspheric surface to a plane tangential to the aspheric surface at the optical axis; $c=1/r$, r is the paraxial radius of curvature; h represents a height of a point on the aspheric surface with respect to the optical axis; k represents a cone constant; and A, B, C, D, E, F and G are aspheric coefficients for fourth, sixth, eighth, tenth, twelfth, fourteenth and sixteenth order terms.

The present invention will be more fully understood by describing four embodiments as follows.

The numerical data of Numerical Embodiments 1, 2, 3 and 4 will be shown below. In each numerical embodiment, i (i=1–15) indicates the order of the surface from the object side (including lens surface, stop 5 and glass member 6), Ri indicates the curvature radius of the ith surface, D indicates the ith member thickness or the distance between the ith surface and the (i+1)th surface, and Nd and Vd indicate the refractive index and Abbe number of the ith member, respectively, for d-line.

| Numerical Embodiment 1 | | | | | |
|---|---|---|---|---|---|
| Surface (i) | Ri (mm) | D (mm) | Nd | Vd | Conic |
| 1 | 17.2 | 0.9 | 1.5435 | 56.8 | 0.9887158 |
| 2 | 2.9 | 2.013–1.068–1.46 | | | −1.0 |
| 3 | 4.847 | 1.35 | 1.7552 | 27.5 | 0.0 |
| 4 | 6.18 | 0.08 | 1.52 | 52.0 | 0.0 |
| 5 | 7.646 | 6.18–3.183–0.432 | | | 0.0 |
| 6(stop) | ∞ | 0.17 | | | 0.0 |
| 7 | 3.82 | 0.07 | 1.52 | 52.0 | −1.0 |
| 8 | 3.4 | 1.8 | 1.772 | 49.6 | 0.0 |
| 9 | −3.043 | 0.5 | 1.648 | 33.8 | 0.0 |
| 10 | 3.53 | 0.3 | | | 0.0 |
| 11 | 3.862 | 0.8 | 1.5247 | 56.4 | 2.316358 |
| 12 | 5.3 | 0.837–6.103–9.694 | | | 1.115277 |
| 13 | −320.264 | 1.3 | 1.5435 | 56.8 | 0.0 |
| 14 | −6.8 | 3.4–2.04–0.85 | | | 1.115277 |
| 15 | ∞ | 0.81 | 1.5163 | 64.1 | 0.0 |

Various parameters and values of conditional expressions of the present zoom lens system according to Numerical Embodiment 1 are listed in the following table:

| | |
|---|---|
| F number | 2.8–4.2–5.5 |
| Effective focal length | 4.24–7.92–12.0 (Zoom Ratio: 2.83) |
| Total Track | 20.5 mm |
| $F_{12T}/F_3$ | 1.75 |
| $F_4/F_3$ | 1.88 |
| $R_{12}/TT$ | 0.259 |
| $R_3/TT$ | 0.236 |

Figure 4:
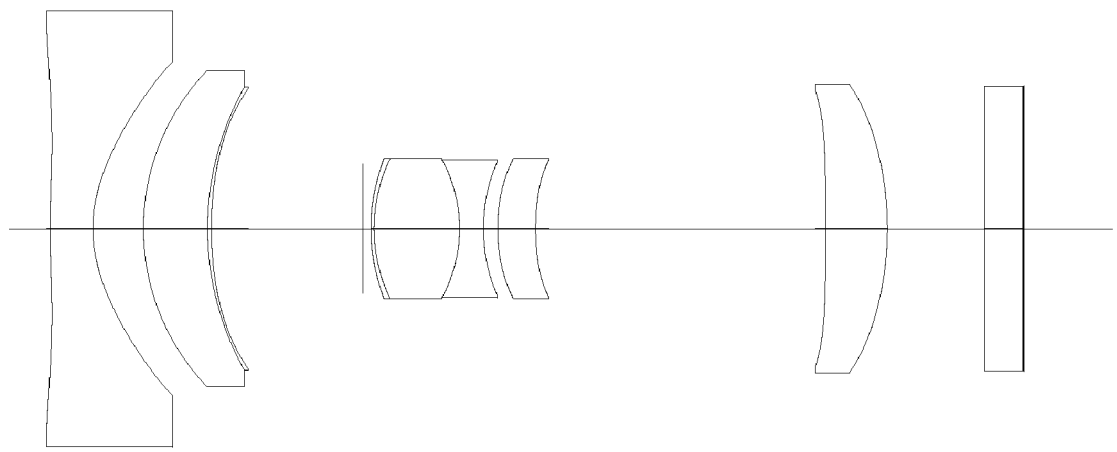
FIG. 4 is an optical cross-sectional view of a compact zoom lens system in accordance with Numerical Embodiment 1 of the present invention.
Figure 5:
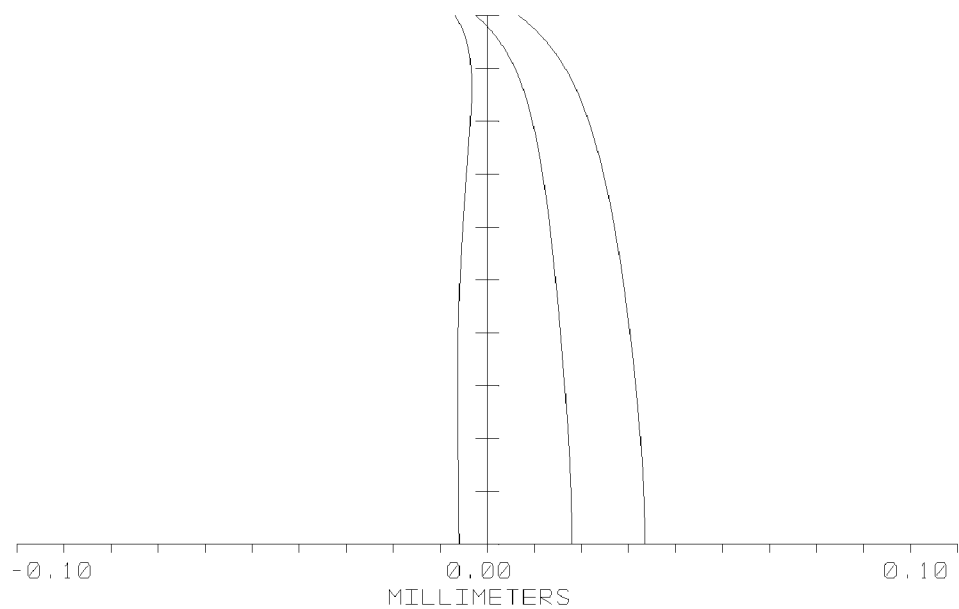
FIGS. 5–8 respectively show longitudinal aberration, lateral chromatic aberration, field curvature and distortion aberration at the telephoto end of the present compact zoom lens system according to Numerical Embodiment 1.
Figure 6:
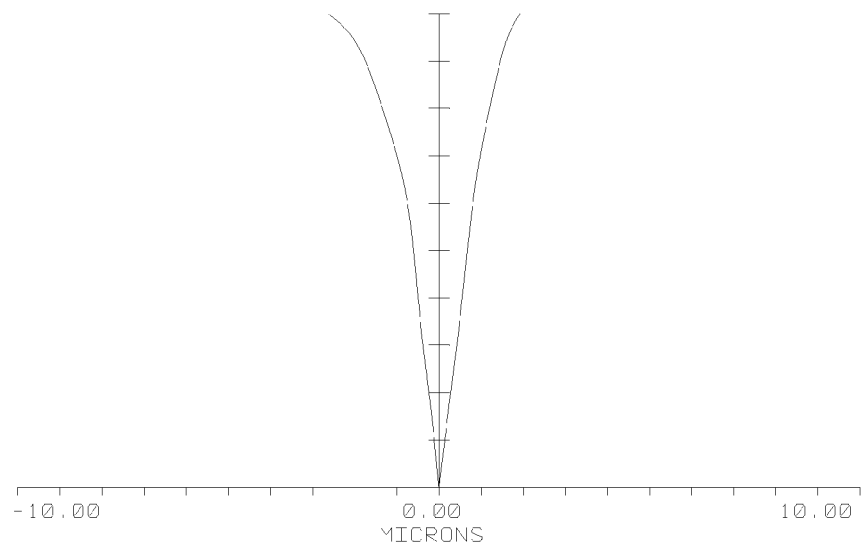
Figures 7, 8:
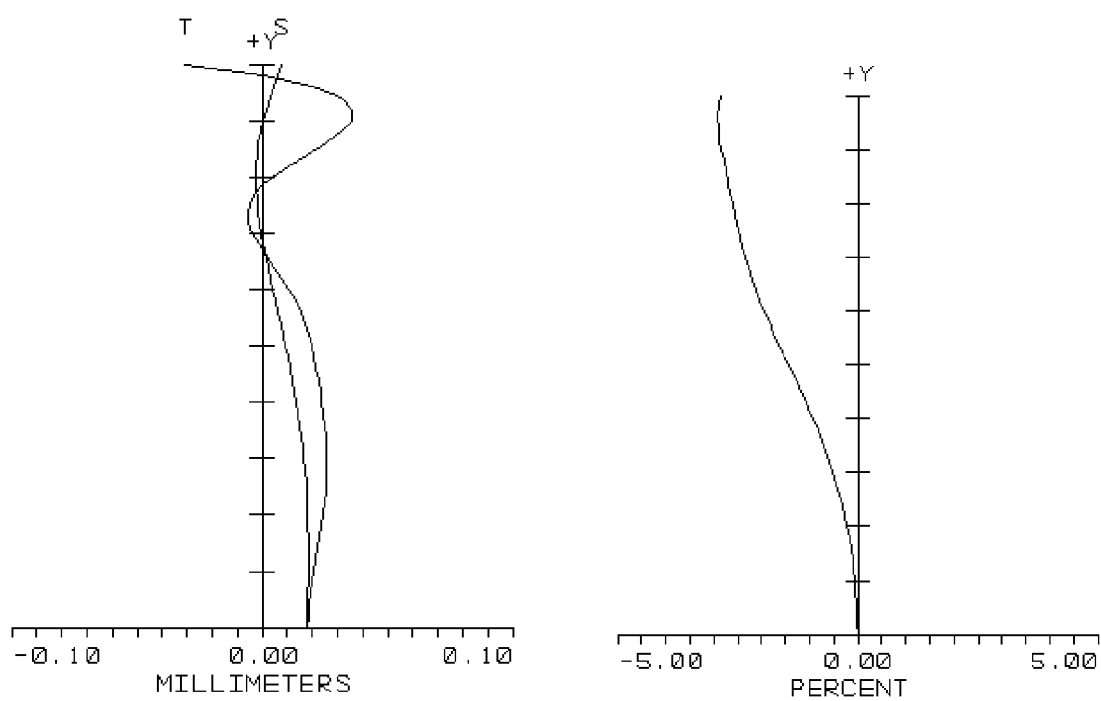
Figure 9:
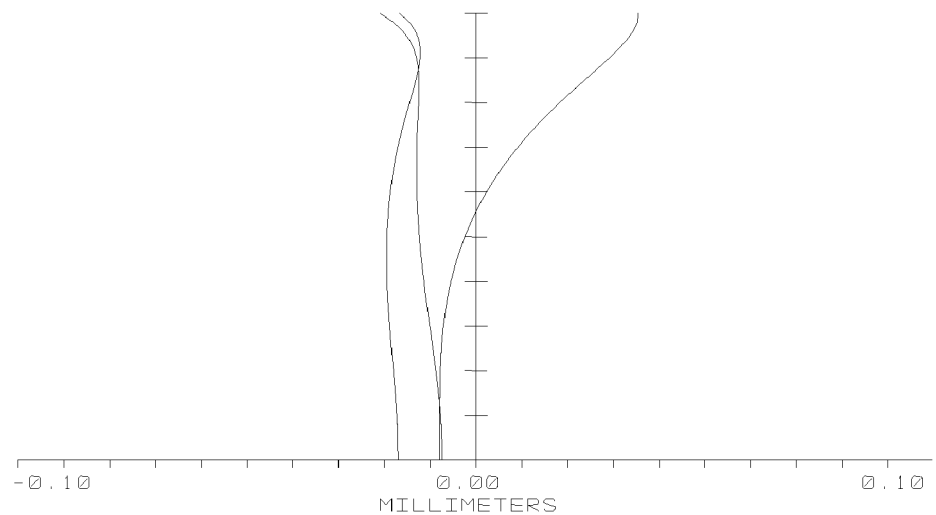
FIGS. 9–12 respectively show longitudinal aberration, lateral chromatic aberration, field curvature and distortion aberration at the intermediate zoom position of the present compact zoom lens system according to Numerical Embodiment 1.
Figure 10:
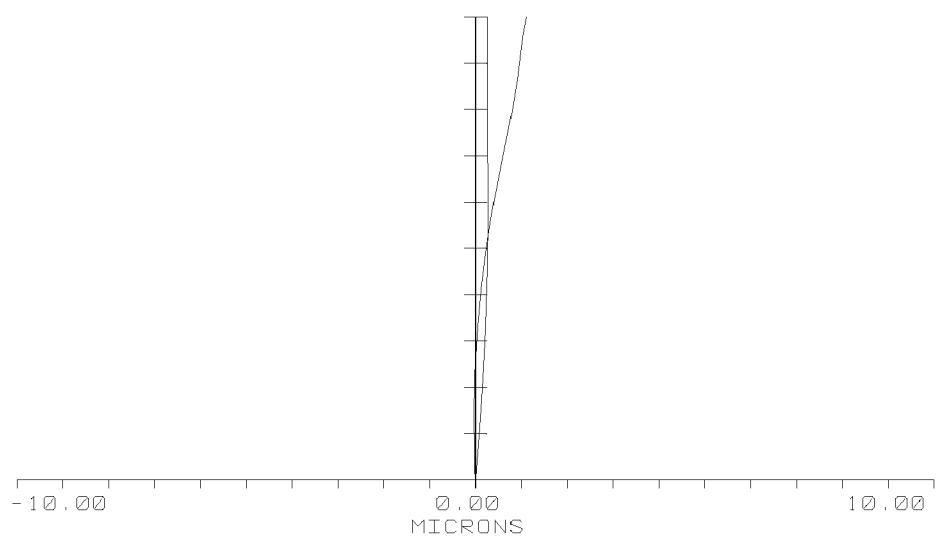
Figure 11:
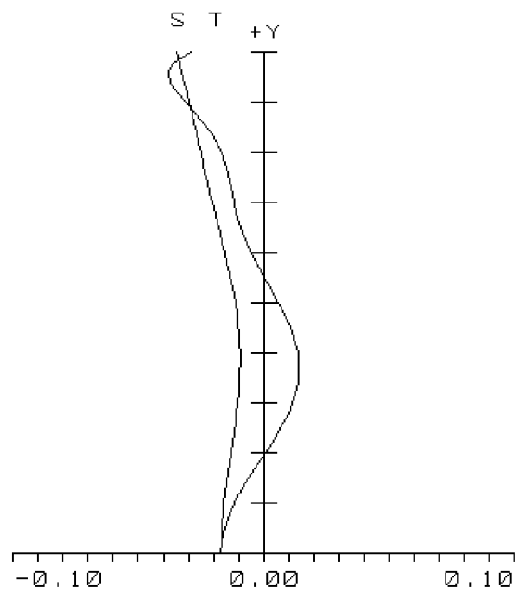
Figure 12:
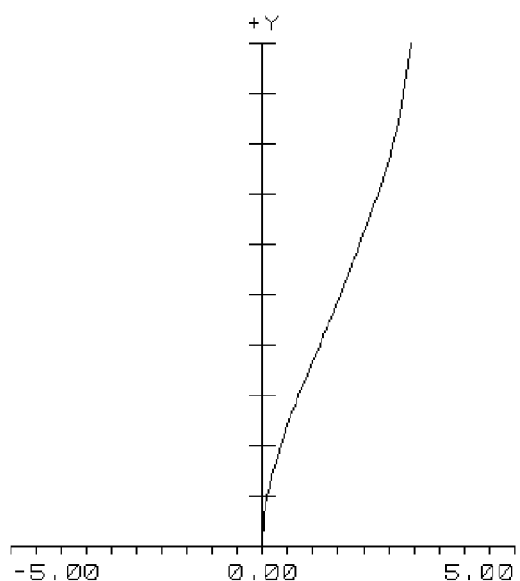
Figure 13:
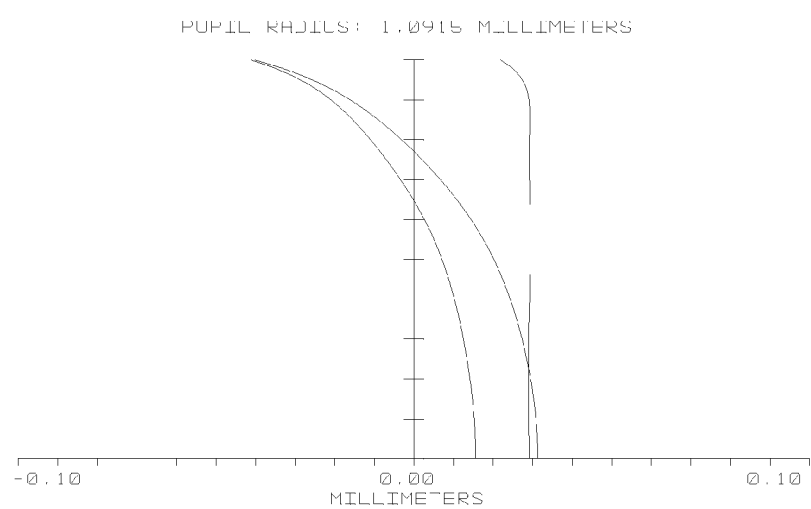

According to Numerical Embodiment 1 of the present zoom lens system, as shown in FIGS. 1 and 4, surfaces R1, R2, R5, R7, R12, R13 and R14 are all configured to be aspheric surfaces. Aspheric coefficients for these aspheric surfaces are illustrated below:

| Coef. Surface (i) | A | B | C | D | E | F | G |
|---|---|---|---|---|---|---|---|
| 1 | −0.0074488106 | 0.00077844738 | −4.5872806e−005 | 1.4030697e−006 | −1.6783565e−008 | 0 | 0 |
| 2 | −0.0086551579 | 0.00078137776 | −4.0894304e−006 | −4.8335223e−006 | 2.4636571e−007 | 0 | 0 |
| 5 | 0.0014502427 | 3.9880677e−005 | 5.136139e−006 | 1.9498251e−006 | −2.0348965e−007 | 0 | 0 |
| 7 | −0.00087671866 | −0.00026827417 | 3.6387222e−005 | −2.9468502e−005 | 5.4989245e−006 | 0 | 0 |
| 12 | 0.017376582 | 0.0013473516 | 0.00021886545 | 6.7748502e−005 | −7.7808929e−006 | 0 | 0 |
| 13 | −0.0032903036 | 0.00040977156 | −4.3176411e−005 | −3.161855e−006 | 4.0486278e−007 | 0 | 0 |
| 14 | 0.00079148725 | −0.00021741662 | 7.063048e−005 | −1.2230594e−005 | 6.2825963e−007 | 0 | 0 |

It is clear from the above table that, in the Numerical Embodiment 1 of the present invention, all the respective values of the above conditions (a-1), (a-2), (a-3) and (a-4) fall within the required range. Longitudinal aberration, lateral chromatic aberration, field curvature and distortion aberration of the present compact zoom lens system according to Numerical Embodiment 1 at the telephoto end, the intermediate zoom position and the wide-angle end are respectively shown in FIGS. 5–16. It can be seen that the present compact zoom lens system of Numerical Embodiment 1 provides excellent correction of various aberrations and thus a high level of optical performance.

Numerical Embodiment 2

| Surface (i) | Ri (mm) | D (mm) | Nd | Vd | Conic |
|---|---|---|---|---|---|
| 1 | 28.952 | 0.9 | 1.5435 | 56.8 | 0.0 |
| 2 | 3.185 | 2.458–1.115–1.27 | | | −1.53 |
| 3 | 4.914 | 1.2 | 1.7552 | 27.5 | 0.0 |
| 4 | 7.0 | 0.08 | 1.52 | 52.0 | 0.0 |
| 5 | 8.223 | 5.668–3.02–0.438 | | | 0.0 |
| 6(stop) | ∞ | 0.17 | | | 0.0 |
| 7 | 4.25 | 0.07 | 1.52 | 52.0 | −1.0 |
| 8 | 3.82 | 1.8 | 1.772 | 49.6 | 0.0 |
| 9 | −2.5 | 0.5 | 1.648 | 33.8 | 0.0 |
| 10 | 5.0 | 0.18 | | | 0.0 |
| 11 | 3.168 | 0.7 | 1.5247 | 56.4 | 1.036 |
| 12 | 2.86 | 0.955–6.136–9.6 | | | −2.6013 |
| 13 | −23760.0 | 1.45 | 1.5435 | 56.8 | 8304.7 |
| 14 | −5.95 | 3.05–1.87–0.74 | | | 1.115277 |
| 15 | ∞ | 0.81 | 1.5163 | 64.1 | 0.0 |

Various parameters and values of conditional expressions of the present zoom lens system according to Numerical Embodiment 2 are listed in the following table:

| | |
|---|---|
| F number | 2.8–4.2–5.5 |
| Effective focal length | 4.21–7.97–12.1 (Zoom Ratio: 2.87) |
| Total Track | 20.0 mm |
| $F_{12T}/F_3$ | 2.05 |
| $F_4/F_3$ | 1.55 |
| $R_{12}/TT$ | 0.143 |
| $R_3/TT$ | 0.246 |

Figure 17:
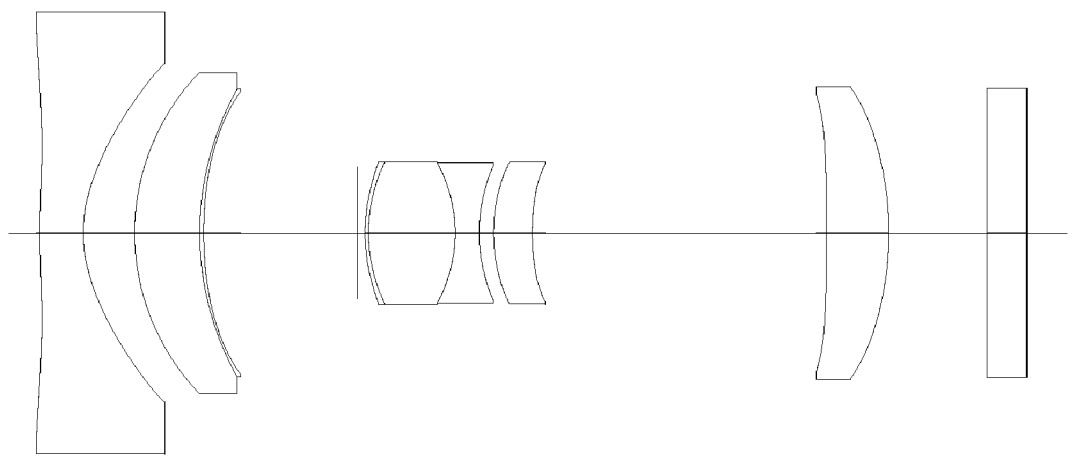
FIG. 17 is an optical cross-sectional view of a compact zoom lens system in accordance with Numerical Embodiment 2 of the present invention.
Figure 18:
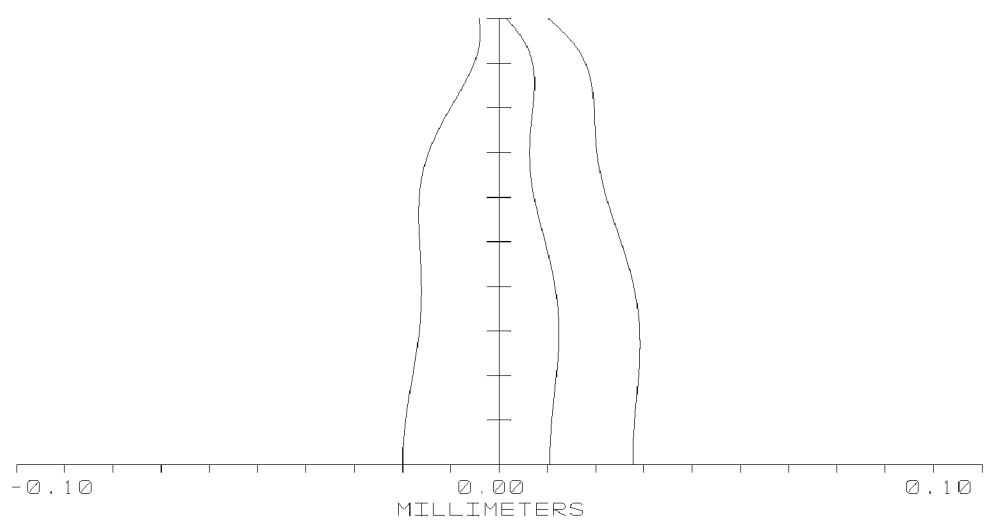
FIGS. 18–21 respectively show longitudinal aberration, lateral chromatic aberration, field curvature and distortion aberration at the telephoto end of the present compact zoom lens system according to Numerical Embodiment 2.
Figure 19:
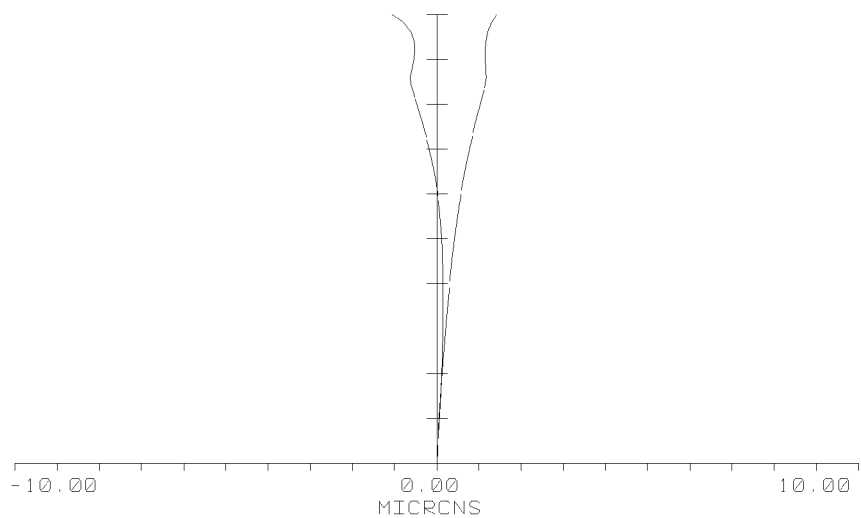
Figures 20, 21:
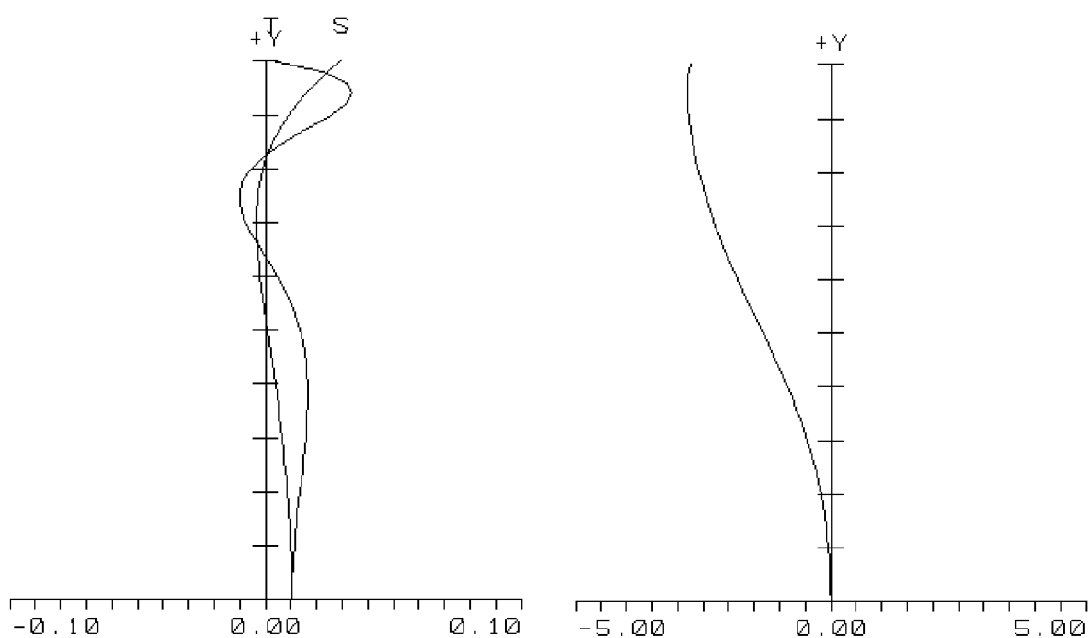
Figure 22:
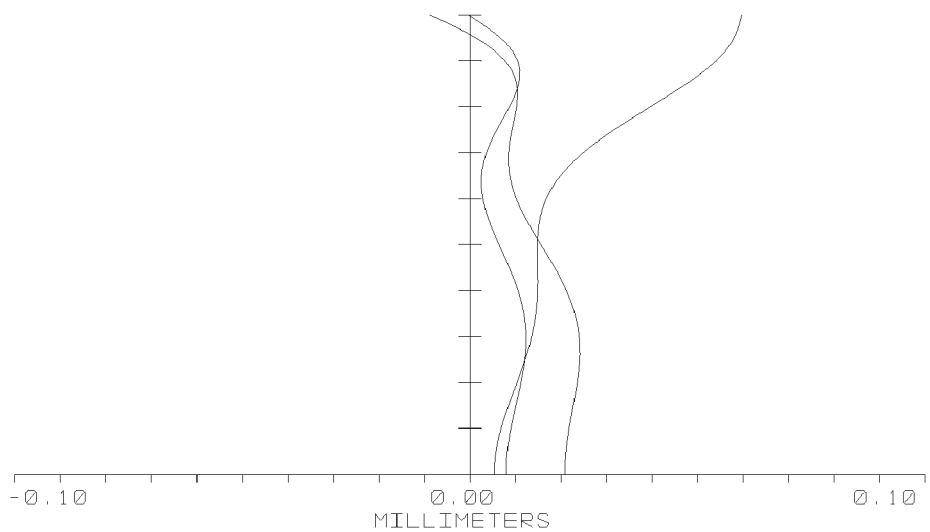
FIGS. 22–25 respectively show longitudinal aberration, lateral chromatic aberration, field curvature and distortion aberration at the intermediate zoom position of the present compact zoom lens system according to Numerical Embodiment 2.
Figure 23:
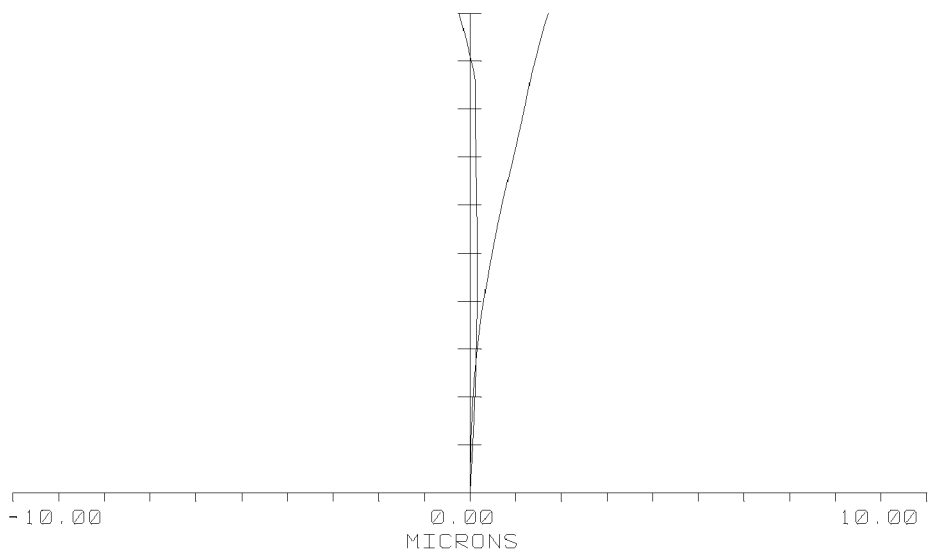
Figure 24:
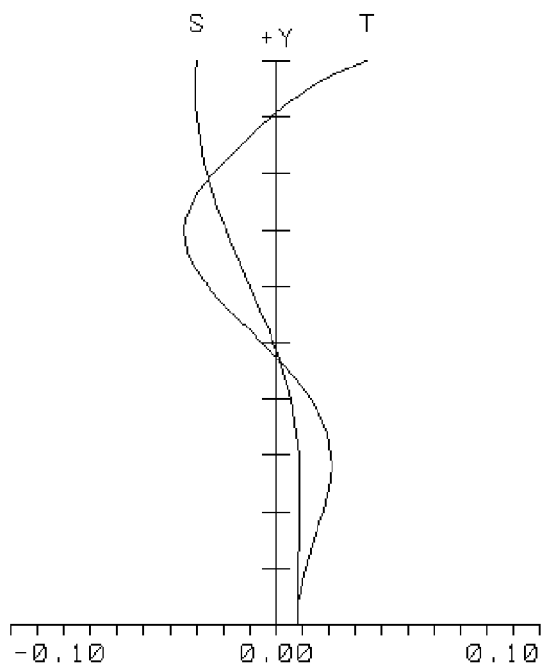
Figure 25:
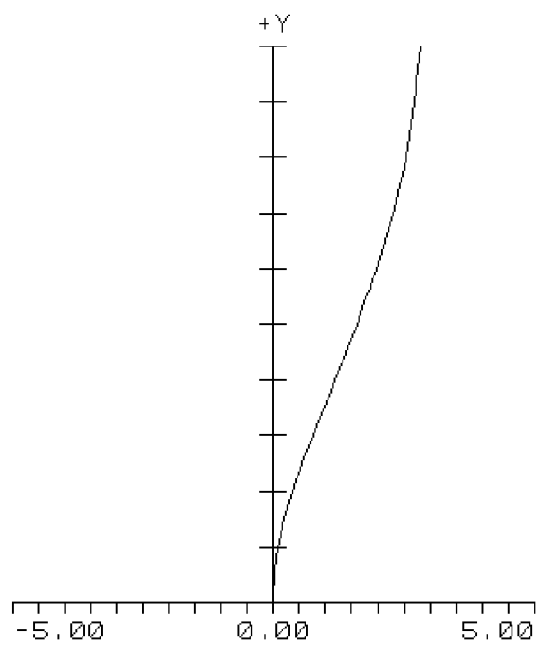
Figure 26:
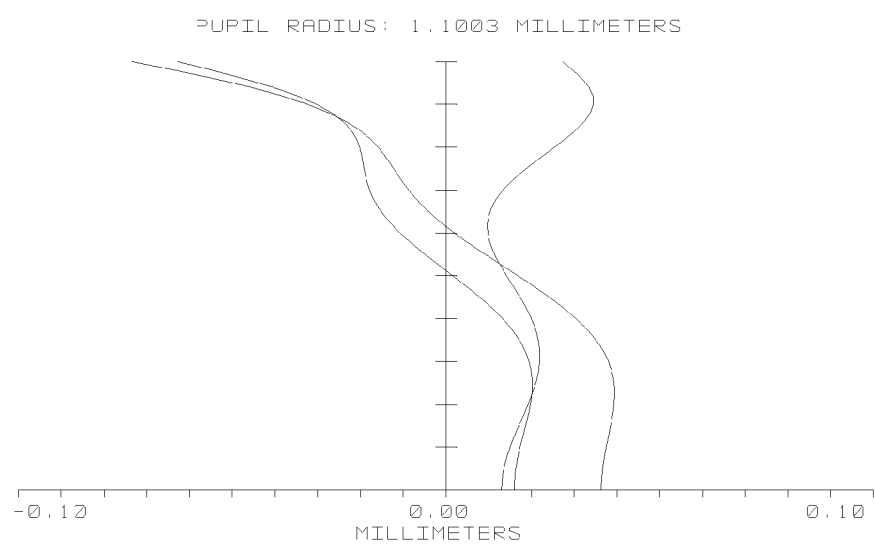

According to Numerical Embodiment 2 of the present zoom lens system, as shown in FIGS. 1 and 17, surfaces R1, R2, R5, R7, R12, R13 and R14 are all configured to be aspheric surfaces. Aspheric coefficients for these aspheric surfaces are illustrated below:

| Coef. Surface (i) | A | B | C | D | E | F | G |
|---|---|---|---|---|---|---|---|
| 1 | −0.0074856416 | 0.00078977466 | −4.7224095e−005 | 1.5100087e−006 | −1.91854e−008 | 0 | 0 |
| 2 | −0.0073929247 | 0.0007463296 | −1.9114685e−005 | −2.3846053e−006 | 1.5157482e−007 | 0 | 0 |
| 5 | 0.001820972 | 0.00012551963 | −9.0704914e−006 | 1.9421931e−006 | −1.7642444e−007 | 0 | 0 |
| 7 | −0.0023165461 | 0.00064107341 | −0.0010134681 | 0.00039268785 | −6.0978958e−005 | 0 | 0 |
| 12 | 0.024550385 | 0.0028800584 | −0.0018296183 | 0.00097969618 | −0.00013781224 | 0 | 0 |
| 13 | −0.0030627114 | 0.00038626326 | −2.326491e−005 | −7.2371187e−006 | 6.4723579e−007 | 0 | 0 |
| 14 | 0.00097372294 | −0.00024854799 | 7.1449455e−005 | −1.1246893e−005 | 6.1117397e−007 | 0 | 0 |

It is clear from the above table that, in the Numerical Embodiment 2 of the present invention, all the respective values of the above conditions (a-1), (a-2), (a-3) and (a-4) fall within the required range. Longitudinal aberration, lateral chromatic aberration, field curvature and distortion aberration of the present compact zoom lens system according to Numerical Embodiment 2 at the telephoto end, the intermediate zoom position and the wide-angle end are respectively shown in FIGS. 18–29. It can be seen that the present compact zoom lens system of Numerical Embodiment 2 provides excellent correction of various aberrations and thus a high level of optical performance.

It is clear from the above table that, in the Numerical Embodiment 3 of the present invention, all the respective values of the above conditions (a-1), (a-2), (a-3) and (a-4) fall within the required range. Longitudinal aberration, lateral chromatic aberration, field curvature and distortion aberration of the present compact zoom lens system according to Numerical Embodiment 3 at the telephoto end, the intermediate zoom position and the wide-angle end are respectively shown in FIGS. 31–42. It can be seen that the present compact zoom lens system of Numerical Embodiment 3 provides excellent correction of various aberrations and thus a high level of optical performance.

Numerical Embodiment 3

| Surface (i) | Ri (mm) | D (mm) | Nd | Vd | Conic |
|---|---|---|---|---|---|
| 1 | 40.552 | 0.9 | 1.5435 | 56.8 | 0.0 |
| 2 | 3.335 | 2.128–0.933–1.144 | | | −1.7222 |
| 3 | 4.914 | 1.2 | 1.7552 | 27.5 | 0.0 |
| 4 | 7.187 | 0.08 | 1.52 | 52.0 | 0.0 |
| 5 | 8.256 | 5.786–3.07–0.338 | | | 0.0 |
| 6(stop) | ∞ | 0.17 | | | 0.0 |
| 7 | 4.259 | 0.07 | 1.52 | 52.0 | −0.94056 |
| 8 | 3.985 | 1.8 | 1.772 | 49.6 | 0.0 |
| 9 | −2.5 | 0.5 | 1.648 | 33.8 | 0.0 |
| 10 | 5.226 | 0.209 | | | 0.0 |
| 11 | 3.113 | 0.7 | 1.5247 | 56.4 | 1.01479 |
| 12 | 2.824 | 0.909–6.0–9.513 | | | −2.78116 |
| 13 | −347.163 | 1.45 | 1.5435 | 56.8 | 0.0 |
| 14 | −5.886 | 3.15–1.96–0.97 | | | −0.008696 |
| 15 | ∞ | 0.81 | 1.5163 | 64.1 | 0.0 |

Various parameters and values of conditional expressions of the present zoom lens system according to Numerical Embodiment 3 are listed in the following table:

| F number | 2.8–4.19–5.5 |
|---|---|
| Effective focal length | 4.26–7.96–12.2 (Zoom Ratio: 2.86) |
| Total Track | 19.85 mm |
| $F_{12T}/F_3$ | 1.985 |
| $F_4/F_3$ | 1.57 |
| $R_{12}/TT$ | 0.14 |
| $R_3/TT$ | 0.25 |

Figure 30:
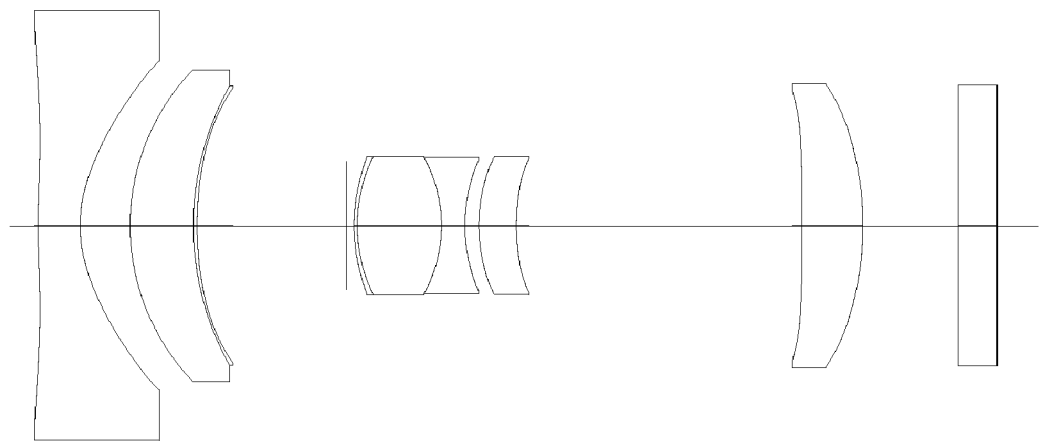
FIG. 30 is an optical cross-sectional view of a compact zoom lens system in accordance with Numerical Embodiment 3 of the present invention.
Figure 31:
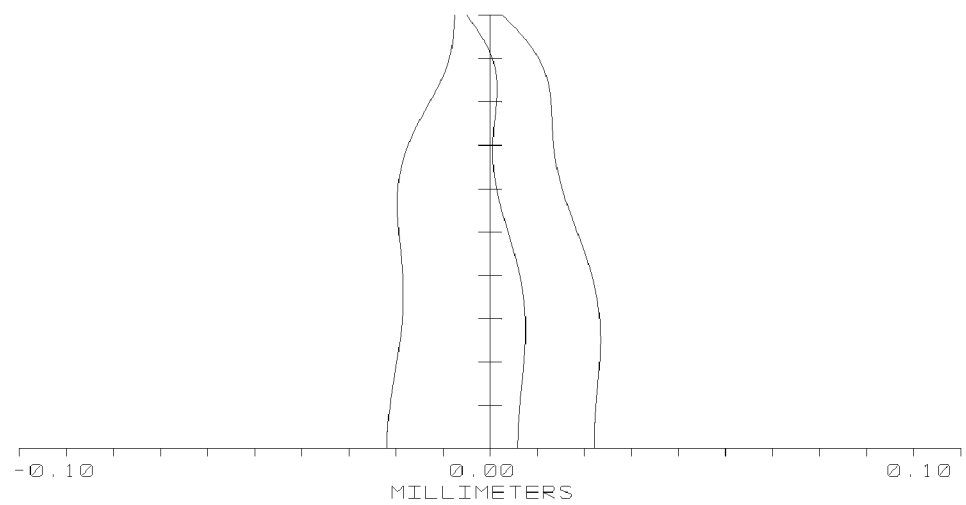
FIGS. 31–34 respectively show longitudinal aberration, lateral chromatic aberration, field curvature and distortion aberration at the telephoto end of the present compact zoom lens system according to Numerical Embodiment 3.
Figure 32:
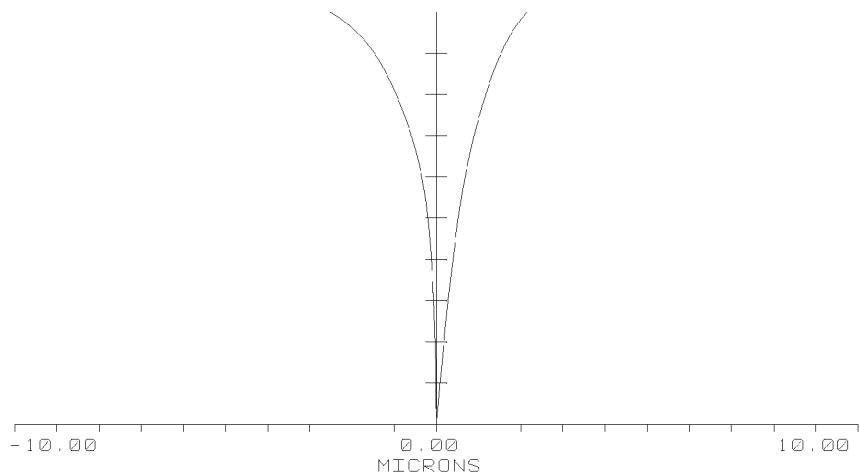
Figures 33, 34:
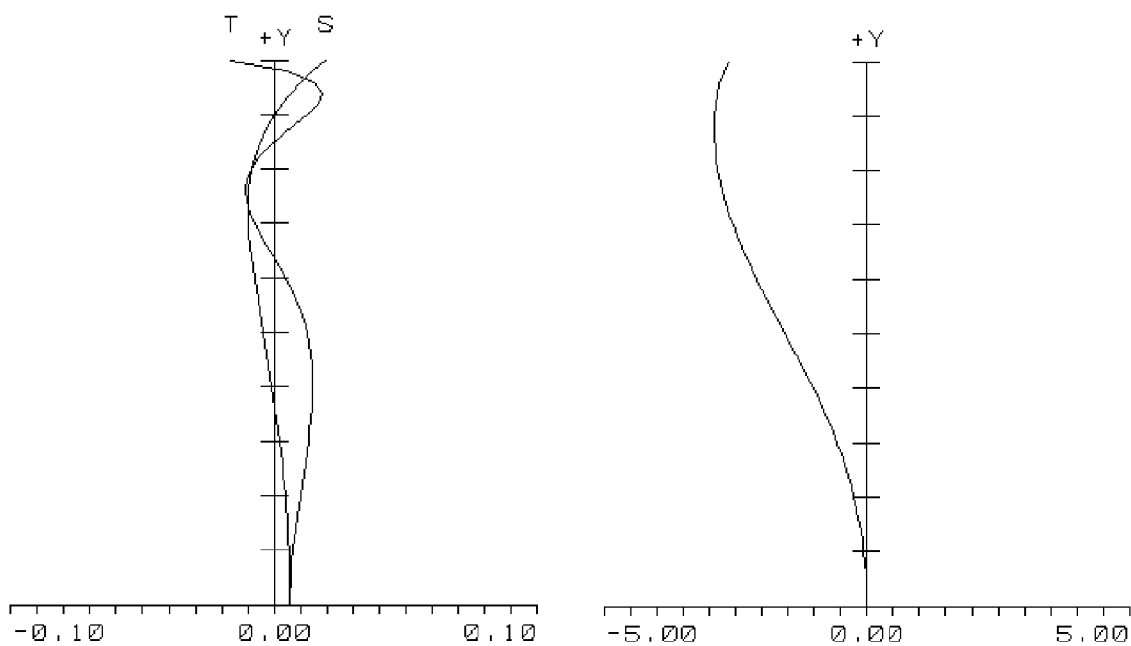
Figure 35:
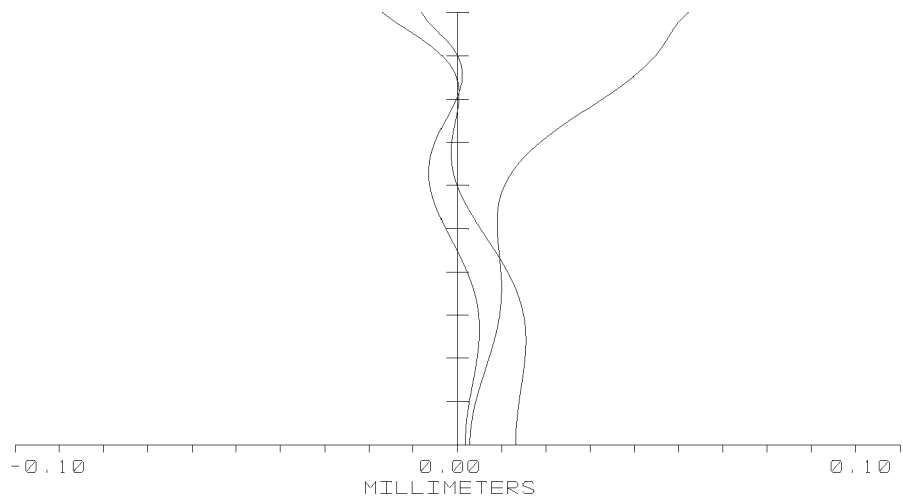
FIGS. 35–38 respectively show longitudinal aberration, lateral chromatic aberration, field curvature and distortion aberration at the intermediate zoom position of the present compact zoom lens system according to Numerical Embodiment 3.
Figure 36:
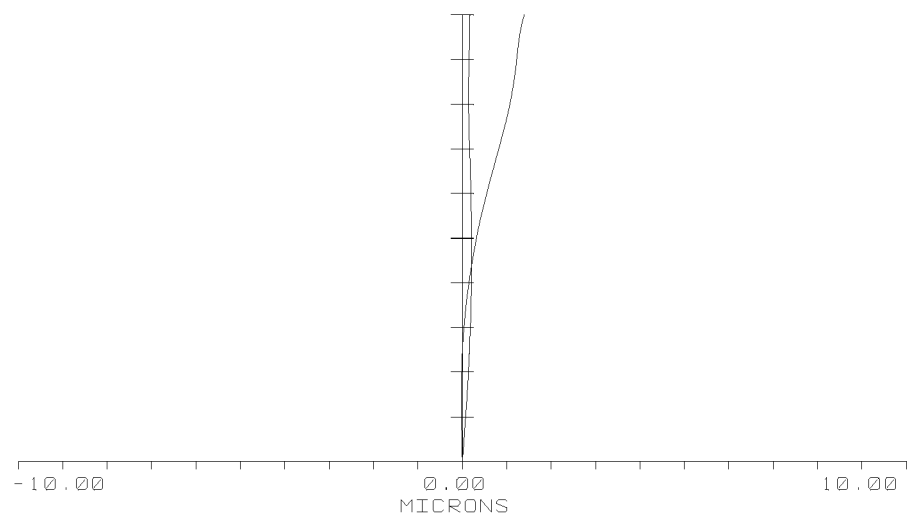
Figure 37:
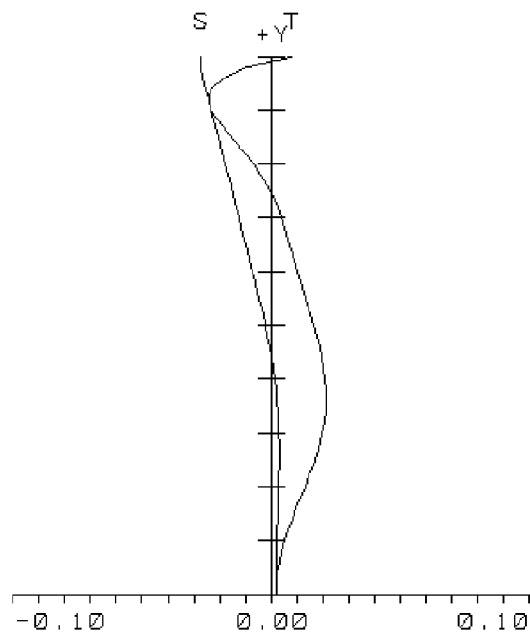
Figure 38:
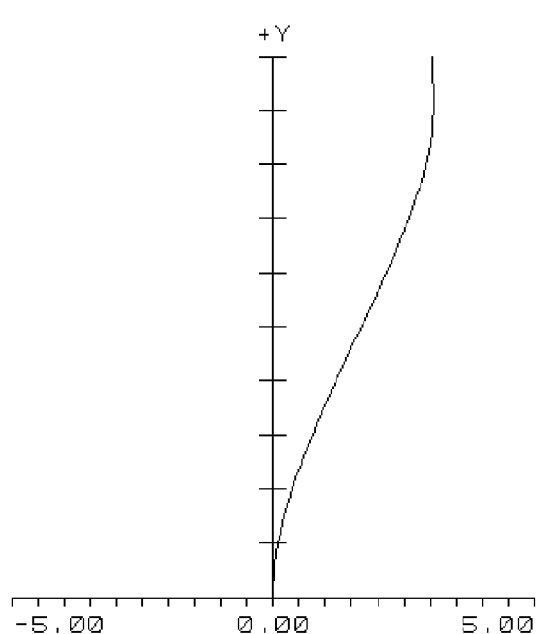
Figure 39:
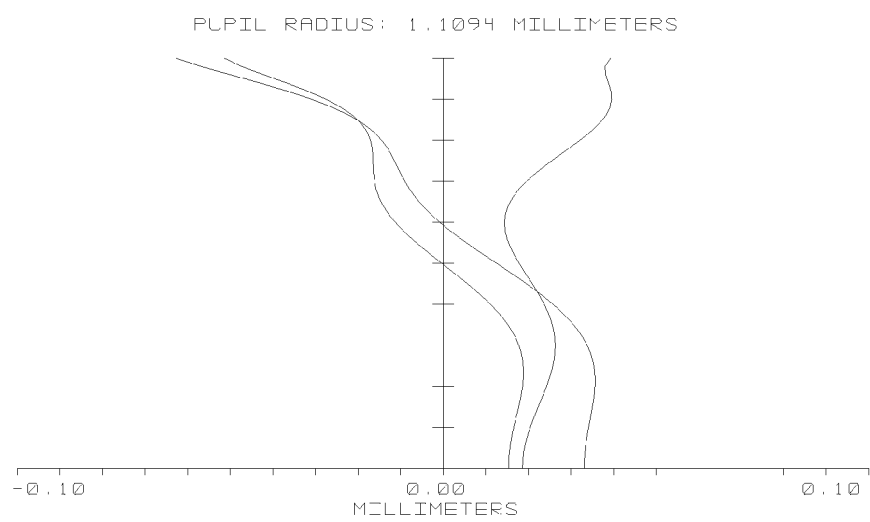

According to Numerical Embodiment 3 of the present zoom lens system, as shown in FIGS. 1 and 30, surfaces R1, R2, R5, R7, R12, R13 and R14 are all configured to be aspheric surfaces. Aspheric coefficients for these aspheric surfaces are illustrated below:

Numerical Embodiment 4

| Surface (i) | Ri (mm) | D (mm) | Nd | Vd | Conic |
|---|---|---|---|---|---|
| 1 | 20.43 | 0.9 | 1.5435 | 56.8 | 0.0 |
| 2 | 3.193 | 3.063–1.21–1.309 | | | −1.56727 |
| 3 | 5.132 | 1.2 | 1.7552 | 27.5 | 0.0 |
| 4 | 7.288 | 0.08 | 1.52 | 52.0 | 0.0 |
| 5 | 8.221 | 5.265–3.087–0.334 | | | 0.0 |
| 6(stop) | ∞ | 0.17 | | | 0.0 |
| 7 | 4.502 | 0.07 | 1.52 | 52.0 | −1.0 |
| 8 | 4.345 | 1.8 | 1.772 | 49.6 | 0.0 |
| 9 | −2.5 | 0.5 | 1.648 | 33.8 | 0.0 |
| 10 | 6.138 | 0.2 | | | 0.0 |
| 11 | 3.135 | 0.7 | 1.5247 | 56.4 | 0.8115 |
| 12 | 2.708 | 1.081–6.219–9.761 | | | −3.084 |
| 13 | −1008.8 | 1.45 | 1.5435 | 56.8 | 0.0 |
| 14 | −5.902 | 3.07–1.91–1.05 | | | −0.008696 |
| 15 | ∞ | 0.81 | 1.5163 | 64.1 | 0.0 |

Various parameters and values of conditional expressions of the present zoom lens system according to Numerical Embodiment 4 are listed in the following table:

| F number | 2.8–4.19–5.5 |
|---|---|
| Effective focal length | 4.19–7.97–12.25 (Zoom Ratio: 2.92) |
| Total Track | 20.3 mm |
| $F_{12T}/F_3$ | 2.18 |
| $F_4/F_3$ | 1.51 |
| $R_{12}/TT$ | 0.133 |
| $R_3/TT$ | 0.253 |

Figure 43:
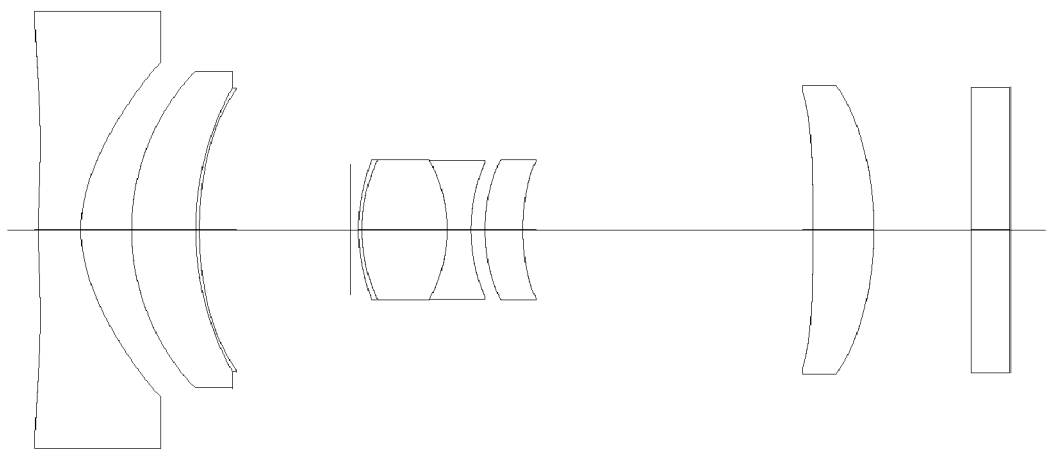
FIG. 43 is an optical cross-sectional view of a compact zoom lens system in accordance with Numerical Embodiment 4 of the present invention.
Figure 44:
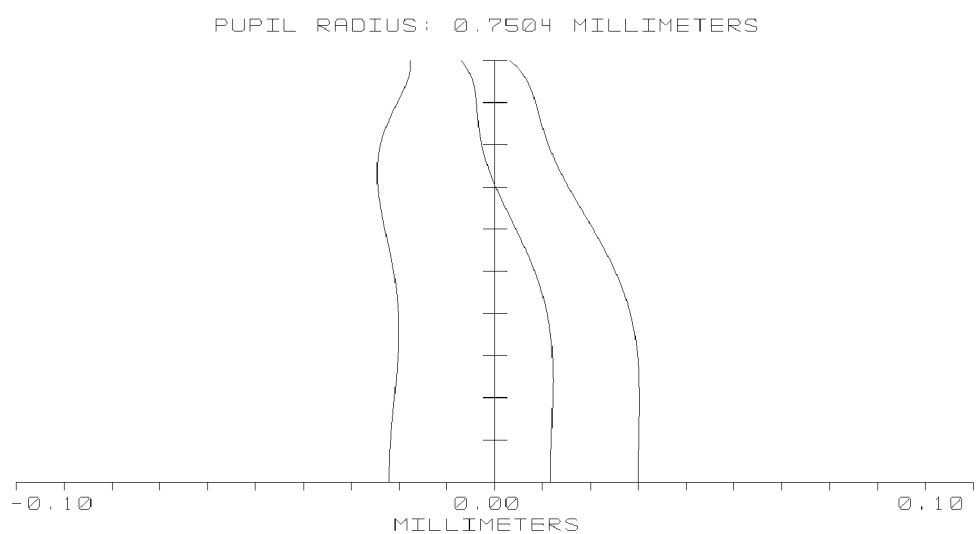
Figure 48:
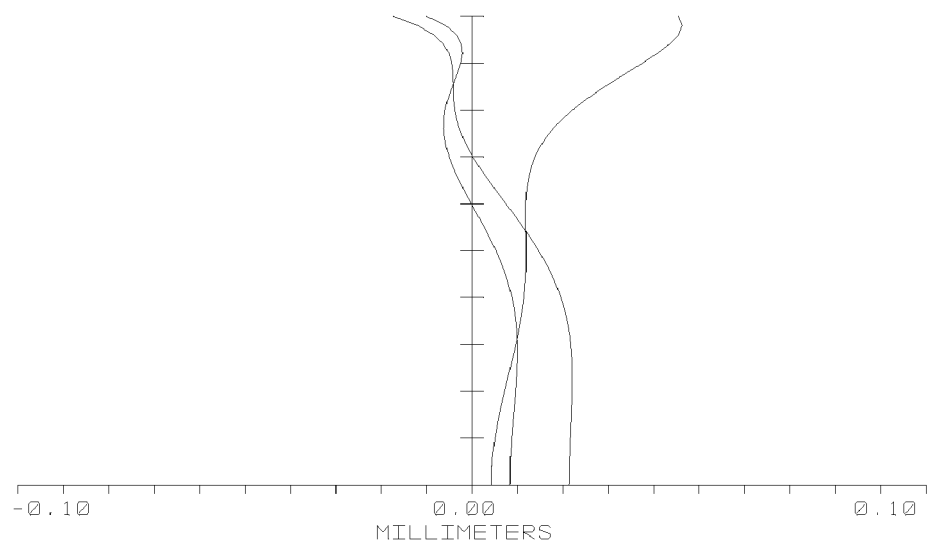
FIGS. 48–51 respectively show longitudinal aberration, lateral chromatic aberration, field curvature and distortion aberration at the intermediate zoom position of the present compact zoom lens system according to Numerical Embodiment 4.
Figure 49:
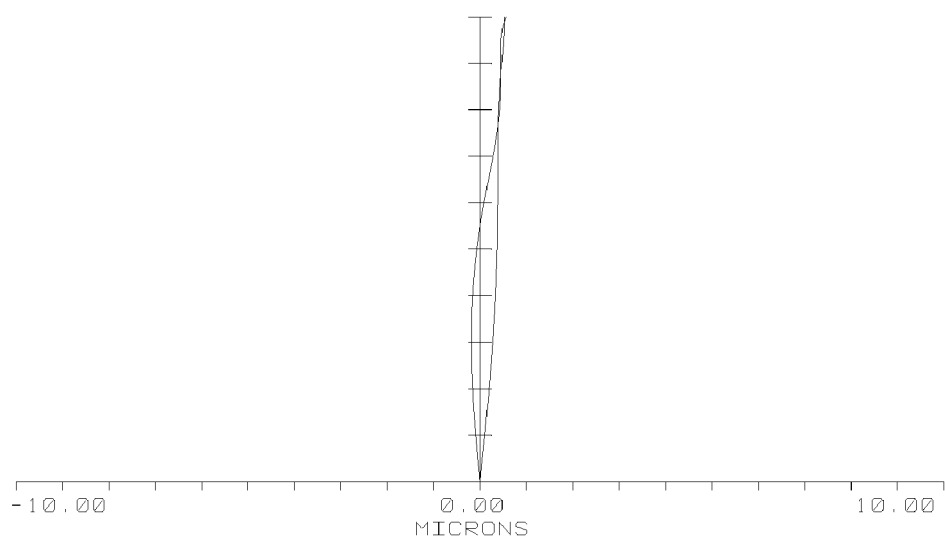
Figure 50:
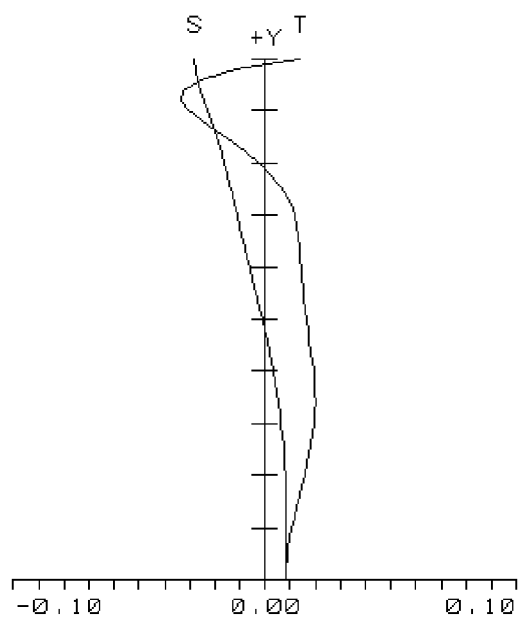
Figure 51:
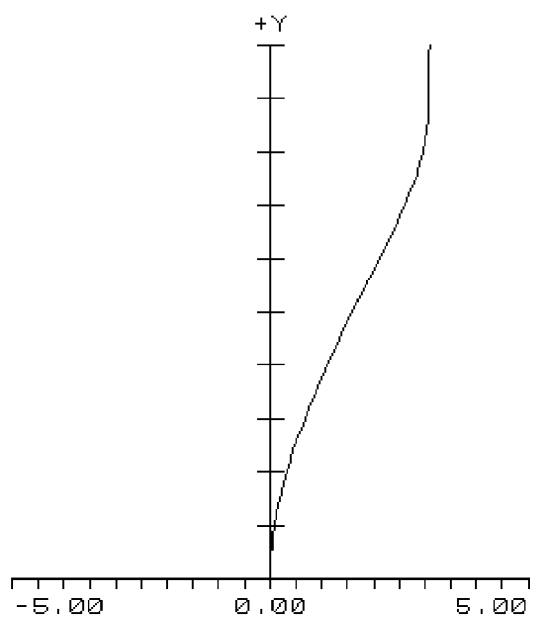
Figure 52:
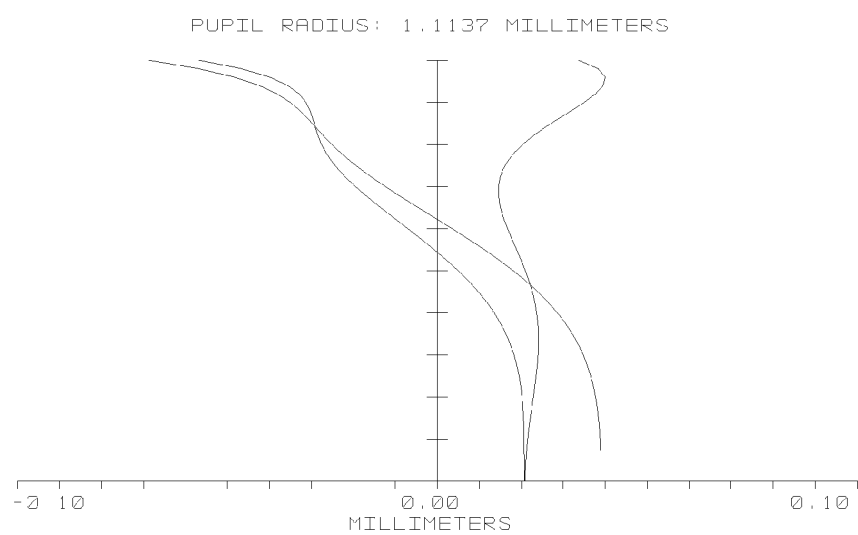
FIGS. 52–55 respectively show longitudinal aberration, lateral chromatic aberration, field curvature and distortion aberration at the wide-angle end of the present compact zoom lens system according to Numerical Embodiment 4.
Figure 53:
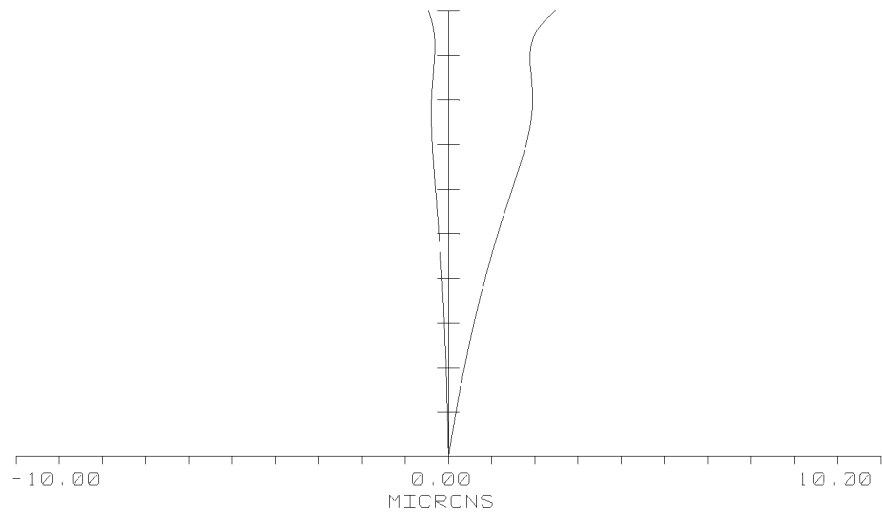
Figures 54, 55:
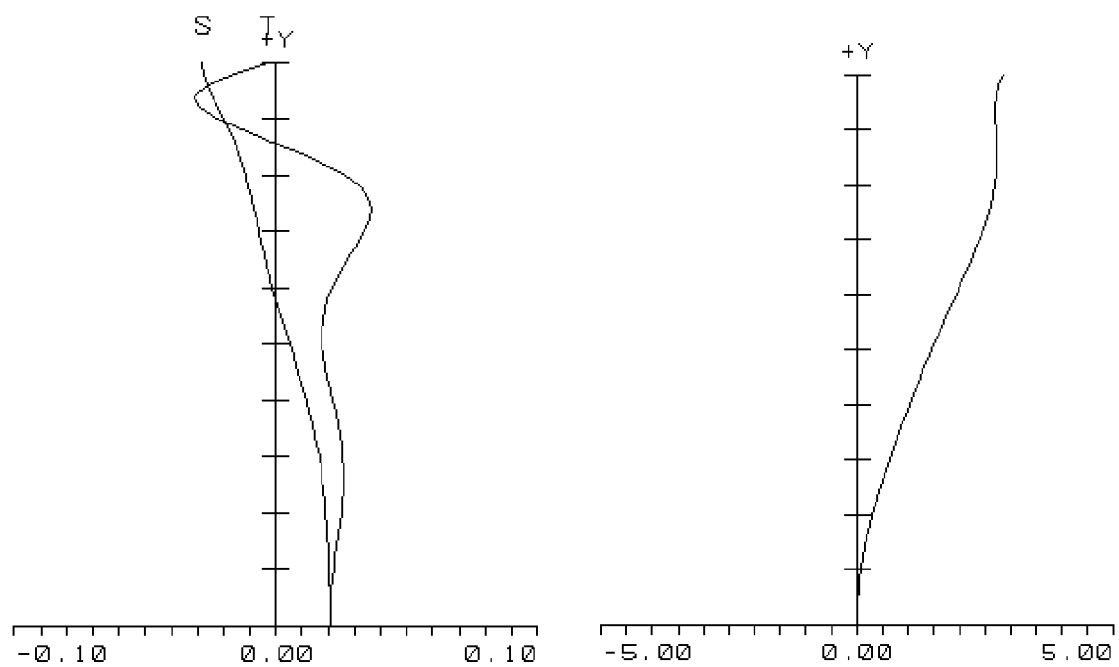

According to Numerical Embodiment 4 of the present zoom lens system, as shown in FIGS. 1 and 43, surfaces R1, R2, R5, R7, R12, R13 and R14 are all configured to be aspheric surfaces. Aspheric coefficients for these aspheric surfaces are illustrated below:

| Coef. Surface (i) | A | B | C | D | E | F | G |
|---|---|---|---|---|---|---|---|
| 1 | −0.0070255247 | 0.00076865311 | −4.7416578e−005 | 1.5905834e−006 | −2.1404904e−008 | 0 | 0 |
| 2 | −0.006401787 | 0.00071669502 | −2.4760283e−005 | −1.7865743e−006 | 1.4427868e−007 | 0 | 0 |
| 5 | 0.0018366189 | 6.8142192e−005 | 8.5103629e−006 | 0 | −1.164048e−007 | 0 | 0 |
| 7 | −0.002555028 | 0.0008868338 | −0.0012566164 | 0.00052037839 | −8.6564792e−005 | 0 | 0 |
| 12 | 0.02545025 | 0.0038921979 | −0.002705606 | 0.0012401183 | −0.00015055925 | 0 | 0 |
| 13 | −0.0028131626 | 0.00027086945 | 5.3900873e−006 | −7.2763908e−006 | 5.4015445e−007 | 0 | 0 |
| 14 | 0.0012775569 | −0.00029904656 | 9.4742552e−005 | −1.4363979e−005 | 7.0286625e−007 | 0 | 0 |

| Coef. Surface (i) | A | B | C | D | E | F | G |
|---|---|---|---|---|---|---|---|
| 1 | −0.0081600373 | 0.00082028936 | −4.6701042e−005 | 1.4016571e−006 | −1.6645194e−008 | 0 | 0 |
| 2 | −0.0078429019 | 0.00077229695 | −1.8032461e−005 | −2.2575659e−006 | 1.2515967e−007 | 0 | 0 |
| 5 | 0.0013953143 | 0.00022196708 | −4.9156406e−005 | 7.9936973e−006 | −4.7227902e−007 | 0 | 0 |
| 7 | −0.0024612602 | 0.00043154682 | −0.00045010278 | 4.7086855e−005 | 7.8443311e−006 | 0 | 0 |
| 12 | 0.026928692 | 0.0031547376 | −0.0029607818 | 0.0013626977 | −0.00018608565 | 0 | 0 |
| 13 | −0.0030928671 | 0.00032856942 | −1.6589455e−005 | −7.1345989e−006 | 6.3803447e−007 | 0 | 0 |
| 14 | 0.00066754341 | −8.85736e−005 | 5.7527267e−005 | −1.3140826e−005 | 7.3915683e−007 | 0 | 0 |

It is clear from the above table that, in the Numerical Embodiment 4 of the present invention, all the respective values of the above conditions (a-1), (a-2), (a-3) and (a-4) fall within the required range. Longitudinal aberration, lateral chromatic aberration, field curvature and distortion aberration of the present compact zoom lens system according to Numerical Embodiment 4 at the telephoto end, the intermediate zoom position and the wide-angle end are respectively shown in FIGS. 44–55. It can be seen that the present compact zoom lens system of Numerical Embodiment 4 provides excellent correction of various aberrations and thus a high level of optical performance.

According to the concept of the present invention, the present zoom lens system is a four-group zoom lens system having a negative-positive-positive-positive optical configuration. Both the first lens group and the image plane positions are fixed. By movement of the second and third lens groups, zooming is effected. By movement of the fourth lens group, the shift of image-plane position resulting from zooming can be compensated, whereby a clear image can be obtained. The present compact zoom lens system is composed of only six single lenses and thus has an overall length of only 20 mm while achieving an approximately 3× zoom ratio. Sufficient back focal length is ensured even for such a short overall length. By incorporating aspheric lenses into the present zoom lens system for aberration correction, a high level of optical performance can be ensured.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A zoom lens system comprising, from the object side to the image side, a first lens group of negative refractive power for receiving light from the object, a second lens group of positive refractive power, a third lens group of positive refractive power and a fourth lens group of positive refractive power, the first lens group being stationary, the second lens group comprising a hybrid lens having a first resin layer formed on an image side thereof, the third lens group including a cemented lens having a second resin layer formed on an object side thereof; the overall length of the zoom lens system being fixed, both the second and third lens groups being movable along the optical axis for effecting focal length change, the fourth lens group being movable along the optical axis to compensate for image plane shift due to focal length change and thereby maintain the position of the image plane.

2. The zoom lens system as claimed in claim 1, satisfying the following conditional expression:

$$1.3 < \frac{F_{12T}}{F_3} < 2.6$$

where $F_{12T}$ represents the combined focal length of the first and the second lens groups at the long focal length extremity, and $F_3$ represents the focal length of the third lens group.

3. The zoom lens system as claimed in claim 2, wherein the third and fourth lens groups satisfy the following conditional expression:

$$1.1 < \frac{F_4}{F_3} < 2.2$$

where $F_4$ represents the focal length of the fourth lens group, and $F_3$ represents the focal length of the third lens group.

4. The zoom lens system as claimed in claim 3, wherein the first lens group includes an aspheric light-receiving lens having a first surface R1 on the object side and an opposite second surface R2 on the image side.

5. The zoom lens system as claimed in claim 4, wherein the hybrid lens of the second lens group includes a first surface R3 on the object side and an opposite second surface R4 on the image side, and the first resin layer is formed on the second surface R4.

6. The zoom lens system as claimed in claim 5, wherein at least one of the first and second surfaces of the hybrid lens is aspheric.

7. The zoom lens system as claimed in claim 6, wherein the third lens group further includes a plastic lens.

8. The zoom lens system as claimed in claim 7, wherein the cemented lens of the third lens group is composed of a convex lens of positive refractive power and a concave lens of negative refractive power, and the second resin layer is formed on the object-side surface R8 of the convex lens.

9. The zoom lens system as claimed in claim 8, wherein the plastic lens of the third lens group includes a first surface R11 on the object side and an opposite second surface R12 on the image side, at least one of the first and second surfaces R11, R12 being aspheric.

10. The zoom lens system as claimed in claim 9, wherein the fourth lens group includes a plastic lens having a first surface R13 on the object side and an opposite second surface R14 on the image side, at least one of the first and second surfaces R13, R14 being aspheric.

11. The zoom lens system as claimed in claim 10, satisfying the following conditional expression:

$$0.1 < \frac{R_{12}}{TT} < 0.3$$

where $R_{12}$ represents the curvature radius of image-side surface R12 of the plastic lens of the third lens group, and TT represents the total track of the zoom lens system.

12. The zoom lens system as claimed in claim 11, satisfying the following conditional expression:

$$0.18 < \frac{R_3}{TT} < 0.33$$

where $R_3$ represents the curvature radius of the object-side surface R3 of the hybrid lens of the second lens group, and TT represents the total track of the zoom lens system.

13. The zoom lens system as claimed in claim 12 further comprising a stop disposed between the second and third lens groups.

14. The zoom lens system as claimed in claim 13 further comprising a glass member disposed between the fourth lens group and the image plane, the glass member being a cover glass or an IR (infrared) filter.

15. The zoom lens system as claimed in claim 14, wherein the light-receiving lens of the first lens group is made of plastic.

16. The zoom lens system as claimed in claim 15, wherein the hybrid lens of the second lens group is made of glass.

17. A zoom lens system comprising, from the object side to the image side, a first lens group of negative refractive power for receiving light from the object, a second lens group of positive refractive power, a third lens group of positive refractive power and a fourth lens group of positive refractive power; wherein, the first lens group is stationary, the overall length of the zoom lens system is fixed, both the second and third lens groups are movable along the optical axis for effecting focal length change, the fourth lens group is movable along the optical axis to compensate for image plane shift due to focal length change and thereby maintain the position of the image plane, and the zoom lens system satisfies the following two conditional expressions:

$$1.3 < \frac{F_{12T}}{F_3} < 2.6 \quad 1.1 < \frac{F_4}{F_3} < 2.2$$

where $F_{12T}$ represents the combined focal length of the first and the second lens groups at the long focal length extremity, $F_3$ represents the focal length of the third lens group, and $F_4$ represents the focal length of the fourth lens group.

18. The zoom lens system as claimed in claim 17, wherein the first lens group includes an aspheric light-receiving lens having a first surface R1 on the object side and an opposite second surface R2 on the image side.

19. The zoom lens system as claimed in claim 18, wherein the second lens group includes a hybrid lens having a first surface R3 on the object side and an opposite second surface R4 on the image side, the second surface R4 having a resin layer formed thereon.

20. The zoom lens system as claimed in claim 19, wherein at least one of the first and second surfaces of the hybrid lens is aspheric.

21. The zoom lens system as claimed in claim 20, wherein the third lens group includes a cemented lens, the cemented lens being composed of a convex lens of positive refractive power and a concave lens of negative refractive power, the convex lens having a resin layer formed on an object-side surface R8 thereof.

22. The zoom lens system as claimed in claim 21, wherein the third lens group further includes a plastic lens, the plastic lens having a first surface R11 on the object side and an opposite second surface R12 on the image side, at least one of the first and second surfaces R11, R12 being aspheric.

23. The zoom lens system as claimed in claim 22, wherein the fourth lens group includes a plastic lens having a first surface R13 on the object side and an opposite second surface R14 on the image side, at least one of the first and second surfaces R13, R14 being aspheric.

24. The zoom lens system as claimed in claim 23, satisfying the following conditional expression:

$$0.1 < \frac{R_{12}}{TT} < 0.3$$

where $R_{12}$ represents the curvature radius of the image-side surface R12 of the plastic lens of the third lens group, and TT represents the total track of the zoom lens system.

25. The zoom lens system as claimed in claim 24, satisfying the following conditional expression:

$$0.18 < \frac{R_3}{TT} < 0.33$$

where $R_3$ represents the curvature radius of the object-side surface R3 of the hybrid lens of the second lens group, and TT represents the total track of the zoom lens system.

26. The zoom lens system as claimed in claim 25 further comprising a stop disposed between the second and third lens groups.

* * * * *